US009050957B2

(12) United States Patent
Minato et al.

(10) Patent No.: US 9,050,957 B2

(45) Date of Patent: Jun. 9, 2015

(54) COMPRESSED AIR SUPPLY SYSTEM, COMPRESSED AIR SUPPLY DEVICE FOR VEHICLE, AND METHOD OF CONTROLLING AIR COMPRESSOR

(75) Inventors: Ichiro Minato, Tokyo (JP); Hiroki Hasebe, Tokyo (JP)

(73) Assignee: Nabtesco Automotive Corporation, Tokyo (JP)

( * ) Notice: Subject to any disclaimer, the term of this patent is extended or adjusted under 35 U.S.C. 154(b) by 428 days.

(21) Appl. No.: 13/202,611

(22) PCT Filed: Feb. 23, 2010

(86) PCT No.: PCT/JP2010/052795

§ 371 (c)(1),
(2), (4) Date: Nov. 7, 2011

(87) PCT Pub. No.: WO2010/095754

PCT Pub. Date: Aug. 26, 2010

(65) Prior Publication Data

US 2012/0153711 A1 Jun. 21, 2012

(30) Foreign Application Priority Data

Feb. 23, 2009 (JP) ................................ 2009-039220
Feb. 25, 2009 (JP) ................................ 2009-041671
Mar. 23, 2009 (JP) ................................ 2009-070348
Mar. 25, 2009 (JP) ................................ 2009-073494
Mar. 27, 2009 (JP) ................................ 2009-078518
Jul. 24, 2009 (JP) ................................ 2009-173228

(51) Int. Cl.
*B60T 15/00* (2006.01)
*B60T 17/00* (2006.01)

(Continued)

(52) U.S. Cl.
CPC ............ *B60T 17/004* (2013.01); *B60T 13/662* (2013.01); *B60T 13/683* (2013.01); *B60T 17/02* (2013.01)

(58) Field of Classification Search
USPC ...................... 303/57, 11; 417/279, 292, 282
See application file for complete search history.

(56) References Cited

U.S. PATENT DOCUMENTS 1,980,550 A 11/1934 Boblee
3,602,610 A * 8/1971 Bloom .......................... 417/12

(Continued)

FOREIGN PATENT DOCUMENTS

DE 19737051 A1 3/1999
JP S54-026788 A 2/1979

(Continued)

OTHER PUBLICATIONS

Int'l Search Report issued on Jun. 1, 2010 in Int'l Application No. PCT/JP2010/052795.

(Continued)

*Primary Examiner* — Robert A Siconolfi
*Assistant Examiner* — James Hsiao
(74) *Attorney, Agent, or Firm* — Panitch Schwarze Belisario & Nadel LLP

(57) ABSTRACT

The operation of an air compressor is controlled to control engine performance to thereby improve the performance of the vehicle. A compressor (4) driven by an engine (3) of a vehicle and supplying compressed air to loads (51-54) is controlled by an ECU (2). A loaded state and an unloaded state of the compressor (4) are switched between each other according to the requirements from the loads (51-54). When the vehicle requires braking force, the compressor (4) is set to the loaded state irrespective of the requirements from the loads (51-54).

17 Claims, 20 Drawing Sheets

21 VEHICLE SPEED DETECTOR
22 AUXILIARY BRAKE SWITCH
23 RETARDER
ECU
ENGINE

(51) Int. Cl.

| | |
|---|---|
| ***B60T 13/66*** | (2006.01) |
| ***B60T 13/68*** | (2006.01) |
| ***B60T 17/02*** | (2006.01) |

(56) References Cited

U.S. PATENT DOCUMENTS

| | | | | |
|---|---|---|---|---|
| 4,088,375 | A * | 5/1978 | DePas, Sr. | 303/180 |
| 4,135,860 | A * | 1/1979 | van Nederkassel | 417/12 |
| 4,149,827 | A * | 4/1979 | Hofmann, Jr. | 417/12 |
| 4,351,409 | A * | 9/1982 | Malik | 180/165 |
| 4,459,085 | A * | 7/1984 | Tonegawa | 417/282 |
| 4,756,669 | A * | 7/1988 | Hata | 417/12 |
| 4,863,355 | A * | 9/1989 | Odagiri et al. | 417/12 |
| 4,900,098 | A * | 2/1990 | Kuhn et al. | 303/1 |
| 6,036,449 | A * | 3/2000 | Nishar et al. | 417/292 |
| 6,077,330 | A * | 6/2000 | Sabelstrom | 95/11 |
| 6,089,831 | A * | 7/2000 | Bruehmann et al. | 417/282 |
| 6,379,122 | B1 * | 4/2002 | Little | 417/292 |
| 6,390,779 | B1 * | 5/2002 | Cunkelman | 417/14 |
| 6,391,098 | B1 * | 5/2002 | Thomas | 96/111 |
| 6,923,849 | B2 | 8/2005 | Ueno et al. | |
| 7,043,412 | B1 * | 5/2006 | Schultz | 703/8 |
| 7,344,201 | B1 * | 3/2008 | Bates | 303/57 |
| 7,632,076 | B2 * | 12/2009 | Seitz et al. | 417/1 |
| 7,784,879 | B2 * | 8/2010 | Koelzer | 303/3 |
| 8,467,950 | B1 * | 6/2013 | Pfefferl et al. | 701/100 |
| 2004/0012249 | A1 * | 1/2004 | Koelzer | 303/3 |
| 2004/0083893 | A1 * | 5/2004 | Larsson | 96/108 |

FOREIGN PATENT DOCUMENTS

| | | | |
|---|---|---|---|
| JP | S60-075321 | A | 4/1985 |
| JP | S60-102920 | | 6/1985 |
| JP | 63-194717 | A | 8/1988 |
| JP | 01-077830 | A | 3/1989 |
| JP | H01-140161 | U | 9/1989 |
| JP | 2-8680 | U | 1/1990 |
| JP | H04-118129 | U | 10/1992 |
| JP | 05-049548 | A | 3/1993 |
| JP | H05-026136 | U | 4/1993 |
| JP | 05-505758 | A | 8/1993 |
| JP | H06-510942 | A | 12/1994 |
| JP | H07-311167 | A | 11/1995 |
| JP | H08155248 | A | 6/1996 |
| JP | 11-504294 | A | 4/1999 |
| JP | H11-511529 | A | 10/1999 |
| JP | 2000-064962 | A | 3/2000 |
| JP | 2003060268 | A | 2/2003 |
| JP | 2003-276591 | A | 10/2003 |
| JP | 2004036488 | A | 2/2004 |
| JP | 2004170056 | A | 6/2004 |
| JP | 2004-526628 | A | 9/2004 |
| JP | 2005-066470 | A | 3/2005 |
| JP | 2008-213764 | A | 9/2008 |
| JP | 2008-279370 | A | 11/2008 |
| WO | 91/16224 | A1 | 10/1991 |
| WO | 9305867 | A1 | 4/1993 |
| WO | 02096732 | A1 | 12/2002 |

OTHER PUBLICATIONS

Office Action mailed May 28, 2013 in JP Application No. 2010-290000.

Office Action mailed Jun. 4, 2013 in JP Application No. 2009-173228.

Extended European Search Report issued Apr. 2, 2014 in EP Application No. 10743877.2.

Japanese Office Action dated Nov. 25, 2014 in corresponding JP Patent Application No. 2013-231419.

Office Action issued Feb. 10, 2015 in JP Application No. 2014-043645.

* cited by examiner

FIG. 5

| RETARDER TORQUE DEMAND VALUE | ACCELERATION OR DECELERATION | VEHICLE SPEED | ENGINE TORQUE DEMAND VALUE | OPERATION OF COMPRESSOR |
|---|---|---|---|---|
| LOWER THAN SET VALUE (−125%～SET VALUE) | — | — | — | LOAD (BRAKE ASSIST) |
| SET VALUE OR HIGHER (SET VALUE ～0%) | NORMAL | LOW SPEED | — | NORMAL TRAVEL |
| | | HIGH SPEED | — | UNLOAD (ENGINE ASSIST) |
| | ACCELERATION | — | — | UNLOAD (ENGINE ASSIST) |
| | DECELERATION | — | SET VALUE OR HIGHER | UNLOAD (ENGINE ASSIST) |
| | | | LOWER THAN SET VALUE | NORMAL TRAVEL |

*FIG. 19*

| INSTALLATION POSITION | THRESHOLD VALUE |
|---|---|
| (1) | $\alpha$ |
| (2) | $\beta$ |
| (3) | $\gamma$ |
| (4) | $\alpha$ |
| (5) | $\alpha$ |

COMPRESSED AIR SUPPLY SYSTEM, COMPRESSED AIR SUPPLY DEVICE FOR VEHICLE, AND METHOD OF CONTROLLING AIR COMPRESSOR

CROSS-REFERENCE TO RELATED APPLICATIONS

This application is a Section 371 of International Application No. PCT/JP2010/052795, filed Feb. 23, 2010, which was published in the Japanese language on Aug. 26, 2010, under International Publication No. WO 2010/095754 A1 and the disclosure of which is incorporated herein by reference.

BACKGROUND OF THE INVENTION

The present invention relates generally to a compressed air supply system, a compressed air supply device for a vehicle, and a method of controlling an air compressor, which supplies a compressed air by the air compressor mounted in the vehicle.

Up to now, a device has been known in which when a compressed air discharged from an air compressor for a vehicle is accumulated in an air tank, and supplied to a load of the vehicle, in order to prevent the shortage of pressure in the air tank, the air compressor is switched to a load state according to a status of the vehicle or the course (for example, refer to Patent Literatures 1-4 mentioned below). A control device of Patent Literature 1 detects a pressure in the air tank, and puts the air compressor into the load state when it is discriminated that a brake is frequently used, on the basis of a change in the pressure.

Also, up to now, a device has been known in which in a configuration where the compressed air discharged from the air compressor mounted in the vehicle is accumulated in the air tank, and supplied to the load, a dryer having an adsorption agent (drying agent) that adsorbs moisture of the compressed air is disposed between the air compressor and the tank (for example, refer to Patent Literature 2). A device disclosed in Patent Literature 1 regenerates the adsorption agent while unloading the air compressor, thereby enabling the moisture in the compressed air to be continuously removed.

Further, a dew condensation water may be accumulated in the air dryer, and there is a risk that the dew condensation water is frozen within the air dryer during the cold months. Under the circumstances, up to now, there has been proposed a device in which a heater is disposed within the air dryer to eliminate the operation failure of the air dryer, which is caused by freezing (for example, refer to Patent Literature 3). However, in the configuration having the heater, a valve whose operation fails due to freezing is so heated as to be operable. However, there is a difficulty to prevent the freezing per se.

Also, there has been proposed a device that prevents freezing by discharging the dew condensation water with the use of a phenomenon that the dew condensation water within the air dryer is exhausted together with the compressed air, in the regeneration operation for regenerating the drying agent within the air dryer (for example, refer to Patent Literature 2). In the device of this type, because water per se that is accumulated in the air dryer is exhausted, freezing can be surely prevented.

The device disclosed in Patent Literature 4 regenerates the drying agent while unloading the air compressor, thereby enabling the moisture of the compressed air to be continuously removed.

Also, up to now, in a heavy vehicle such as a truck or a bus, there has been employed an air braking device using a compressed air as a working fluid that actuates a braking chamber. In the braking device of this type, a compressed air supply device for a vehicle which supplies a compressed air to each braking chamber is mounted.

The compressed air supply device for a vehicle includes an air compressor in which the compressed air discharged from the air compressor is accumulated in the air tank, and the compressed air within the air tank is supplied to each braking chamber as necessary. The air dryer having an adsorption agent (drying agent) that adsorbs moisture in the compressed air is disposed between the air compressor and the air tank (for example, refer to Patent Literature 4). The device disclosed in the Patent Literature 1 regenerates the adsorption agent while unloading the air compressor, thereby enabling the moisture of the compressed air to be continuously removed.

Patent Literature 1: Japanese Unexamined Patent Application Publication No. 2003-276591

Patent Literature 2: Japanese Unexamined Patent Application Publication No. Sho-63(1988)-194717

Patent Literature 3: Japanese Unexamined Utility Model Application Publication No. Hei-01(1989)-77830

Patent Literature 4: Japanese Unexamined Patent Application Publication (Translation of PCT Application) No. Hei-5 (1993)-505758

BRIEF SUMMARY OF THE INVENTION

Incidentally, most of the air compressors mounted in the vehicles are driven by engines, and become loads on the engines. Therefore, it is conceivable that the air compressors affect the acceleration performance of the engines and the braking force of engine brakes.

Under the circumstances, a first objective of a preferred embodiment of the present invention is to improve the performance of the vehicle by controlling an influence of the operation of the air compressor on the engine performance.

Further, in the above conventional device, when the deterioration of the absorption agent is advanced with the continuous use, there is a difficulty to recover the adsorption performance even if the regeneration is conducted as described above. Therefore, it is general to periodically replace the adsorption agent with fresh one. The determination of a replacement time for the adsorption agent is conducted through a method using a travel distance of the vehicle as a guide, or through a technique of estimating a state of the adsorption agent on the basis of an atmospheric pressure and a ventilation volume in the dryer. Because both of those methods estimate the state of the adsorption agent, the replacement time for the adsorption agent may be caused earlier than an appropriate time.

Under the circumstances, a second objective of a preferred embodiment of the present invention is to accurately determine the replacement time for the drying agent for removing the moisture in the compressed air discharged from the air compressor.

Also, in the above conventional device, the state of the adsorption agent is estimated, for example, on the basis of the travel distance of the vehicle, or the atmospheric pressure and the ventilation volume in the dryer, and a regeneration interval of the drying agent is set on the basis of the estimated result. Thus, the regeneration condition is not changed according to a state of the drying agent.

Under the circumstances, a third objective of a preferred embodiment of the present invention is to detect a real state of the drying agent for removing the moisture in the compressed air discharged from the air compressor to appropriately regenerate the drying agent.

Incidentally, since the compressed air is consumed in exhausting the moisture such as the dew condensation water accumulated within the air dryer, when the moisture is frequently exhausted, a large amount of compressed air is consumed.

Under the circumstances, a fourth objective of a preferred embodiment of the present invention is to prevent the moisture accumulated in the air dryer from being frozen, and to save the consumption of the compressed air required for exhausting the moisture.

Also, in the conventional compressed air supply device, when the deterioration of the absorption agent is advanced with the continuous use, there is a difficulty to recover the adsorption performance even if the regeneration is conducted as described above. Therefore, it is general to periodically replace the adsorption agent with fresh one. The determination of the replacement time for the adsorption agent is conducted through the method using the travel distance of the vehicle as a guide, or through the technique of estimating the state of the adsorption agent on the basis of the atmospheric pressure and the ventilation volume in the dryer. Because both of those methods estimate the state of the adsorption agent, the replacement time for the adsorption agent may be caused earlier than the appropriate time.

In order to eliminate the above problem, a configuration is assumed in which a humidity detection sensor is disposed downstream of the drying agent, and the deterioration of the adsorption agent is discriminated according to a detected value (humidity value) of the humidity detection sensor after the drying agent has been regenerated to accurately determine the replacement time for the drying agent. However, it is found that the detected value of the humidity detection sensor is different according to the environments (airflow and ambient temperature) of a position at which the sensor is installed. Further, the installation position of the sensor is frequently different according to the vehicles, and it is assumed that there is a difficulty to accurately determine the replacement time for the drying agent according to the detected value of the sensor.

Under the circumstances, a fifth objective of a preferred embodiment of the present invention is to accurately determine the replacement time for the drying agent for removing the moisture in the compressed air discharged from the air compressor regardless of the installation position of the humidity detection sensor.

In order to achieve the above first objective, according to a preferred embodiment of the present invention, there is provided a compressed air supply system, comprising: an air compressor that is driven by an engine of a vehicle; a compressed air supply unit that supplies a compressed air discharged from the air compressor to a load of the vehicle; and a control unit that switches between a load state and an unload state of the air compressor according to a demand of the load, wherein, when the vehicle requires a braking force, the control unit puts the air compressor into a load state regardless of the demand of the load.

Also, according to a preferred embodiment of the present invention, in the compressed air supply system, there is provided a pressure sensor that detects an air pressure in the compressed air supply unit to output the detected air pressure to the control unit, wherein the control unit conducts the operation of switching between the load state and the unload state of the air compressor so that the air pressure in the compressed air supply unit falls within a given range, and puts the air compressor into the load state regardless of the air pressure in the compressed air supply unit when the vehicle requires the braking force.

Also, according to a preferred embodiment of the present invention, in the compressed air supply system, the control unit holds the air compressor in the load state when the vehicle requires the braking force, and opens an exhaust valve disposed in the compressed air supply unit so as to hold the air pressure in the compressed air supply unit within the given range.

Also, according to a preferred embodiment of the present invention, in the compressed air supply system, the control unit discriminates whether there is a case in which the vehicle requires the braking force, or not, on the basis of the operation of ordering the actuation of an auxiliary braking device provided in the vehicle.

Also, according to a preferred embodiment of the present invention, in the compressed air supply system, the control unit puts the air compressor into the unload state in at least any one of a case where the vehicle is being accelerated and a case where the vehicle is traveling at a high speed.

Further, according to a preferred embodiment of the present invention, there is provided a method of controlling an air compressor that is driven by an engine of a vehicle, and supplies a compressed air to a load of the vehicle, comprising: switching between a load state and an unload state of the air compressor according to a demand of the load, and putting the air compressor into the load state regardless of the demand of the load when the vehicle requires a braking force.

In order to achieve the above second objective, according to a preferred embodiment of the present invention, there is provided a compressed air supply device for a vehicle, which includes an air compressor mounted in the vehicle, and supplies a compressed air discharged from the air compressor to a load of the vehicle, the compressed air supply device comprising: an air dryer that removes a foreign material such as moisture included in the compressed air, which is disposed in a discharge line of the air compressor; an oil detection sensor that is disposed in the air dryer; and an output unit that outputs a detection result of the oil detection sensor.

Also, according to a preferred embodiment of the present invention, in the compressed air supply device for a vehicle, the oil detection sensor is disposed within a case of the air dryer.

Also, according to a preferred embodiment of the present invention, in the compressed air supply device for a vehicle, the oil detection sensor is disposed in the vicinity of an introduction part of the air dryer, which introduces the compressed air to the drying agent.

Also, according to a preferred embodiment of the present invention, in the compressed air supply device for a vehicle, the oil detection sensor comprises a concentration sensor that detects an oil mist concentration.

Also, according to a preferred embodiment of the present invention, in the compressed air supply device for a vehicle, the oil detection sensor comprises an electrode disposed in an oil accumulation part of a case bottom in the air dryer.

In order to achieve the above third objective, according to a preferred embodiment of the present invention, there is provided a compressed air supply device for a vehicle, which includes an air compressor mounted in the vehicle, and supplies a compressed air discharged from the air compressor to a load of the vehicle, the compressed air supply device comprising: an air dryer that removes a foreign material such as moisture included in the compressed air, which is disposed in a discharge line of the air compressor; a regeneration unit that regenerates a drying agent in the air dryer under a given regeneration condition; and a humidity detection sensor that is disposed downstream of the drying agent, wherein the regeneration condition is optimized on the basis of the detection result of the humidity detection sensor.

Also, according to a preferred embodiment of the present invention, in the compressed air supply device for a vehicle, there is provided an air tank that accumulates the compressed air to be supplied to the load, wherein the humidity sensor is disposed in the air tank.

Also, according to a preferred embodiment of the present invention, in the compressed air supply device for a vehicle, the regeneration condition includes a condition related to a frequency at which the drying agent is regenerated.

Also, according to a preferred embodiment of the present invention, in the compressed air supply device for a vehicle, the regeneration condition includes a condition related to a ventilation volume when the drying agent is regenerated.

Also, according to a preferred embodiment of the present invention, in the compressed air supply device for a vehicle, the regeneration condition is optimized when the detection result is any one or both of a case where a humidity level after the drying agent is regenerated is a given threshold level or higher, and a case where the humidity level has a tendency to increase.

In order to achieve the above fourth objective, according to a preferred embodiment of the present invention, there is provided a compressed air supply device for a vehicle, which includes an air compressor mounted in the vehicle, and supplies a compressed air discharged from the air compressor to a load of the vehicle, the compressed air supply device comprising: an air dryer that removes a foreign material such as moisture included in the compressed air, which is disposed in a discharge line of the air compressor; and an exhaust valve that exhausts moisture accumulated in the air dryer together with the compressed air, wherein a temperature is detected, and the exhaust valve is opened to exhaust the moisture accumulated within the air dryer to the external when the detected temperature meets a given condition.

Also, according to a preferred embodiment of the present invention, when the operation of the vehicle stops, the exhaust valve is opened to exhaust the moisture accumulated in the air dryer to the exterior.

Also, according to a preferred embodiment of the present invention, the vehicle is connected to an outside air temperature sensor mounted therein, and the exhaust valve is opened to exhaust the moisture accumulated in the air dryer to the exterior when an outside air temperature detected by the outside air temperature sensor falls below a given temperature.

Also, according to a preferred embodiment of the present invention, a humidity sensor that detects a temperature of the compressed air is disposed in a flow passage of the compressed air downstream of the air dryer, and the exhaust valve is opened to exhaust the moisture accumulated in the air dryer to the exterior when the temperature of the compressed air, which is detected by the temperature sensor, falls below a given temperature.

In order to achieve the above second objective, according to a preferred embodiment of the present invention, there is provided a compressed air supply device for a vehicle, which includes an air compressor mounted in the vehicle, and supplies a compressed air discharged from the air compressor to a load of the vehicle, the compressed air supply device comprising: an air dryer that removes a foreign material such as moisture included in the compressed air, which is disposed in a discharge line of the air compressor; a regeneration unit that regenerates a drying agent in the air dryer in a given timing; a humidity detection sensor that is disposed downstream of the drying agent; and an output unit that outputs a detection result of the humidity detection sensor after the drying agent is regenerated by the regeneration unit.

Also, according to a preferred embodiment of the present invention, in the compressed air supply device for a vehicle, there is provided an air tank that accumulates the compressed air to be supplied to the load, wherein the humidity detection sensor is disposed in the air tank.

Also, according to a preferred embodiment of the present invention, in the compressed air supply device for a vehicle, when the humidity level detected by the humidity detection sensor is indicative of a humidity level of a given threshold value or higher, the drying agent is regenerated regardless of the given timing, and a detection result detected by the humidity detection sensor after the drying agent is regenerated is output from the output unit.

Also, according to a preferred embodiment of the present invention, in the compressed air supply device for a vehicle, there is provided a determination unit that determines a replacement time for the drying agent with the use of the detection result as well as information related to a travel status of the vehicle, and/or information related to the operation status of the air dryer.

According to a preferred embodiment of the present invention, when there is a need to brake the vehicle, the air compressor driven by the engine of the vehicle is put into the load state to exert the load on the engine with the result that the braking force of the engine brake as the auxiliary braking device can be increased.

Also, according to a preferred embodiment of the present invention, oil in the air dryer that removes the moisture from the compressed air from the air compressor is detected, and the detection result is output. Therefore, the existence of the oil that deteriorates the adsorption performance of the adsorption agent which removes the moisture can be directly monitored to determine a state of the adsorption agent, and the adsorption agent can replaced with fresh one in appropriate timing.

Further, according to a preferred embodiment of the present invention, the humidity downstream of the drying agent in the air dryer that removes the moisture from the compressed air from the air compressor can be detected to optimize the regeneration condition of the drying agent on the basis of a real state of the drying agent.

Further, according to a preferred embodiment of the present invention, the consumption of the compressed air, which is caused by exhaust of the moisture, can be suppressed while the freezing of the moisture in the air dryer is surely prevented.

Further, according to a preferred embodiment of the present invention, the humidity downstream of the drying agent in the air dryer that removes the moisture from the compressed air from the air compressor is detected to output the detection result after the drying agent is regenerated. Therefore, the deterioration of the adsorption performance of the drying agent that removes the moisture can be determined, and the drying agent can be replaced with fresh one in an appropriate timing.

In order to achieve the above fifth objective, according to a preferred embodiment of the present invention, there is provided a compressed air supply device for a vehicle, which includes an air compressor mounted in the vehicle, and supplies a compressed air discharged from the air compressor to a load of the vehicle, the compressed air supply device comprising: an air dryer that removes a foreign material such as moisture included in the compressed air, which is disposed in a discharge line of the air compressor; a humidity detection sensor that is installed downstream of the drying agent of the air dryer; a regeneration unit that regenerates the drying agent in the air dryer in a given timing; and a deterioration determination unit that compares the detected value of the humidity detection sensor after the drying agent is regenerated by the regeneration unit with a threshold value set in correspondence with a flow rate of the compressed air at an installation position of the humidity detection sensor to determine the deterioration of the drying agent.

In this configuration, the threshold value may be set to be larger when the humidity detection sensor is installed to a position where the flow rate of the compressed air is higher, and to be smaller when the humidity detection sensor is installed to a position where the flow rate of the compressed air is lower.

Also, an outside air temperature detection sensor that detects an outside air temperature may be provided, and a correction unit that corrects the threshold value according to the detected outside air temperature may be provided.

Also, the correction unit may adjust the amount of correction according to a magnitude of the flow rate of the compressed air.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 5 is a diagram illustrating the operation of the compressed air supply system;

FIG. 19 is a relationship diagram illustrating a relationship between the installation positions of the humidity detection sensor and threshold values.

DETAILED DESCRIPTION OF THE INVENTION

First Preferred Embodiment

Hereinafter, a preferred embodiment of the present invention will be described with reference to the drawings.

Figure 1:
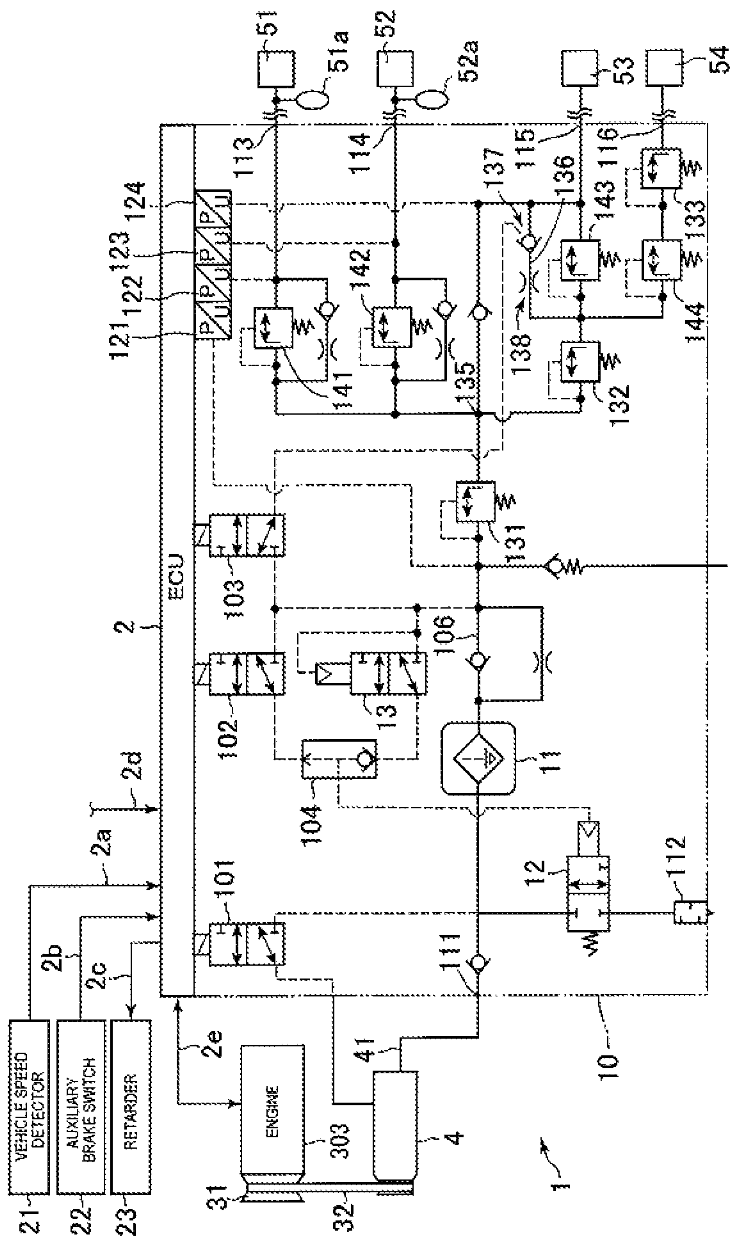
FIG. 1 is a diagram illustrating a configuration of a compressed air supply system according to a first preferred embodiment of the present invention.

FIG. 1 is a diagram illustrating a configuration of a compressed air supply system 1 according to a preferred embodiment of the present invention. FIG. 1 illustrates a circuit configuration of the compressed air supply system 1 together with an engine 303 of a vehicle in which the compressed air supply system 1 is mounted, a vehicle speed detector 21, an auxiliary brake switch 22, and a retarder 23.

The compressed air supply system 1 illustrated in FIG. 1 includes a compressor 4 (air compressor), an ECU 2 (controller) that controls the compressor 4, and an air dryer module 10 (compressed air supply unit) that removes moisture in a compressed air discharged from the compressor 4, and supplies the compressed air to a load of the vehicle.

The ECU 2 is connected with the vehicle speed detector 21 that detects a speed of the vehicle in which the compressed air supply system 1 is mounted, and a vehicle speed signal 2*a* is input to the ECU 2 from the vehicle speed detector 21. Also, the ECU 2 is connected with the auxiliary brake switch 22 provided in the vehicle. The auxiliary brake switch 22 is a switch for detecting the amount of operation of an auxiliary brake lever (not shown) operated by a driver of the vehicle. In this example, the auxiliary brake means a braking device provided separately from a foot pedal (hereinafter referred to as "main brake") by the vehicle, and is directed to the retarder 23 in this preferred embodiment. The auxiliary brake lever has plural steps of operation amounts set according to an intended braking force, and the auxiliary brake switch 22 outputs an operation signal 2*b* corresponding to the operation amount of to the ECU 2.

Further, the ECU 2 is connected with the retarder 23 of the electromagnetic type. The ECU 2 calculates a retarder torque demand value indicative of the braking force of the retarder 23 according to a value of the operation signal 2*b* input from the auxiliary brake switch 22. The ECU 2 outputs a retarder control signal 2*c* to the retarder 23 on the basis of a retarder torque demand value, and the retarder 23 brakes a driving shaft of the vehicle on the basis of the retarder control signal 2*c*.

Also, the ECU 2 receives a vehicle control signal 2*d* indicative of the operation amount of an accelerator pedal of the vehicle or an operation state of a speed gear. In order to conduct various controls such as a fuel injection control of the engine 303 or an ignition control on the basis of the vehicle control signal 2*d*, the ECU 2 outputs an engine control signal 2*e* to the engine 303.

A compressor 4 is coupled to a crank pulley 31 of the engine 303 through an accessory belt 32, and compresses air by the driving force of the engine 303.

The air dryer module 10 is connected with loads 51 to 54 provided in the vehicle. The load 51 is a main brake (front wheels), the load 52 is another main brake (rear wheels), the load 53 is a parking brake, and the load 54 is an accessory type such as a horn or a clutch driving mechanism, which is driven by the compressed air. Each of the loads 51 to 54 includes a compressed air circuit in which the compressed air flows. Further, the load 51 has an air tank 51*a*, and the load 52 has an air tank 52*b*.

Also, the air dryer module 10 includes electromagnetic valves 101, 102, 103 which are opened or closed under the control of the ECU 2, and pressure sensors 121, 122, 123, 124 that detect air pressures in the respective parts of the air dryer module 10, and outputs detected values to the ECU 2. The ECU 2 opens and closes the electromagnetic valves 101 to 103 on the basis of the detected values of the pressure sensors 121 to 123, and the above-mentioned vehicle speed signal 2*a* and operation signal 2*b*.

The compressor 4 is controlled by an air pressure, and its control line is connected with the electromagnetic valve 101, and the compressor 4 is switched between the load state and the unload state by opening or closing the electromagnetic valve 101. In a load state, the compressor 4 is driven by the accessory belt 32 to compress air, and exerts a load on the crank pulley 31. On the contrary, in an unload state, the compressor 4 exerts no load on the engine 303.

A discharge pipe 41 of the compressor 4 is connected to an inflow pipe 111 of the air dryer module 10, and the inflow pipe 111 is connected with a dryer 11. The dryer 11 includes a main body housing a drying agent (not shown), and removes moisture included in the compressed air discharged from the compressor 4 by the drying agent. The dryer 11 is equipped with an exhaust valve 12 (exhaust valve), and when the exhaust valve 12 is opened, the compressed air within the main body of the dryer 11 is exhausted from an exhaust port 112 directly to the external. The exhaust valve 12 is controlled by the air pressure, and its control line is connected with a double check valve 104. The exhaust valve 12 is normally closed, and opened only when an air pressure is applied from the double check valve 104 thereto.

The air dryer module 10 includes a governor 13 that mechanically operates by the air pressure to control the open/close operation of the exhaust valve 12. The governor 13 operates according to the air pressure in a supply channel 106 downstream of the dryer 11, and supplies the air compressor to the double check valve 104 when the air pressure exceeds a given value.

On the other hand, the electromagnetic valve 102 is opened and closed under the control of the ECU 2, and supplies the air pressure of the supply channel 106 to the double check valve 104 in an open state.

When any one of the governor 13 and the electromagnetic valve 102 is opened, the double check valve 104 supplies the air pressure to the exhaust valve 12 to open the exhaust valve 12. Accordingly, when the air pressure in the supply channel 106 is higher than the given value, and when the electromagnetic valve 102 is opened, the exhaust valve 12 is opened, and discharges the compressed air from the exhaust port 112.

In this example, when the exhaust valve 12 is opened, the compressed air downstream of the main body of the dryer 11 flows backward within the main body of the dryer 11, and is discharged from the exhaust port 112. In this situation, air passing through the main body of the dryer 11 becomes super-dried by a rapid pressure reduction, and the moisture is taken from the drying agent in the dryer 11. Therefore, the exhaust valve 12 is opened to regenerate the drying agent.

The air dryer module 10 includes an output port 113 connected with the load 51 (main brake of the front wheels), an output port 114 connected with the load 52 (main brake of the rear wheels), an output port 115 connected with the load 53 (parking brake), and an output port 116 connected with the load 54 (accessory type).

The supply channel 106 downstream of the dryer 11 is connected with a branch chamber 135 through a pressure reducing valve 131. The branch chamber 135 is connected with a supply channel connected to the output port 113 and a supply channel connected to the output port 114. The supply channel connected to the output port 113 is equipped with a protection valve 141, and a supply channel connected to the output port 114 is equipped with a protection valve 142. Also, the branch chamber 135 is connected with a pressure reducing valve 132, and a downstream of the pressure reducing valve 132 is branched into a supply channel connected to the output port 115 and a supply channel connected to the output port 116, which are equipped with protection valves 143 and 144, respectively.

The respective protection valves 141 to 144 are arranged in parallel to a throttle and a check valve, and are closed when the circuits in which the compressed air flows are lost in the loads 51 to 54 connected to the output ports 113 to 116, respectively.

Also, in the supply channel connected from the pressure reducing valve 132 to the output port 116, a pressure reducing valve 133 is arranged downstream of the protection valve 144 to supply a pressure-reduced compressed air to the load 54.

Further, in a supply channel between the pressure reducing valve 132 and the protection valve 143, a supply channel 136 that bypasses the protection valve 143 and is connected to the output port 115 is extended. The supply channel 136 includes a check valve 137 that prevents the compressed air from flowing backward from the output port 115 into the branch chamber 135, and a throttle 138 that is disposed in series with the check valve 137.

The pressure sensor 121 detects the air pressure of the supply channel 106, the pressure sensor 122 detects the air pressure downstream of the protection valve 141, that is, the air pressure of the output port 113. The pressure sensor 123 detects the air pressure of the output port 114, and the pressure sensor 124 detects the air pressure of the output port 116. Those detected values are output to the ECU 2 from the respective pressure sensors 121 to 124 as needed.

Incidentally, in the parking brake device of the vehicle corresponding to the load 53, the braking force is released by the air pressure so as to be travelable. More specifically, the parking brake expands a brake shoe by a spring force to exert the braking force during parking, and closes the brake shoe against the spring force by the air pressure supplied from the air dryer module 10 during releasing.

The load 53 according to this preferred embodiment has no air tank that accumulates the compressed air therein. However, the air dryer module 10 can surely operate the load 53 without the air tank.

That is, the protection valves 141 and 142 are opened when the compressed air circuits of the corresponding loads 51 and 52 are fully filled with the compressed air. Accordingly, the compressed air of the air tanks 51*a* and 52*a* for the main brake can pass through the pressure reducing valve 132 from the branch chamber 135, and be supplied to the output port 115 through the supply channel 136. For that reason, in a state where the air pressures in the air tanks 51*a* and 52*a* are sufficiently high, the parking brake can be released by supplying the compressed air to the load 53.

On the other hand, when the air pressures in the air tanks 51*a* and 52*a*, which are detected by the pressure sensors 122 and 123, are insufficiently, the ECU 2 opens the electromagnetic valve 103. An instructed pressure of the electromagnetic valve 103 is given to the check valve 137, the supply channel 136 is closed by the check valve 137, and the supply channel of the compressed air to the output port 115 is interrupted. In this case, the parking brake cannot be released. However, when the air pressures in the air tanks 51*a* and 52*a*, which are used for the main brake, are insufficient, it is preferable that the parking brake is not released. Also, when the air pressures in the air tanks 51*a* and 51*b* are recovered, the parking brake can be released. Accordingly, even if there is no air tank for the load 53, the parking brake can be stably operated by the compressed air.

The compressed air supply system 1 illustrated in FIG. 1 normally switches between the load state and the unload state of the compressor 4 under the control of the ECU 2 on the basis of the detected value of the pressure sensor 121 in order to hold the air pressure within the air dryer module 10 (for example, the supply channel 106) in a given range. Since the air pressure within the air dryer module 10 is changed according to the required amount of the compressed air in each of the loads 51 to 54, the compressor 4 switches between the load state and the unload state according to the demands of the loads 51 to 54.

In addition to the above operation, the compressed air supply system 1 conducts brake assist operation of boosting the braking force of the engine brake of the engine 303 by switching the compressor 4 to the load state regardless of the demands of the loads 51 to 54 when the auxiliary brake lever is operated.

Further, when the torque of the engine 303 is required such that the vehicle is being accelerated, the compressed air supply system 1 holds the compressor 4 in the unload state, and executes the engine assist operation of reducing the load of the engine 303.

The vehicle includes the retarder 23 as an auxiliary brake in addition to the main brake and the parking brake, and further conducts the braking by the engine brake. When the braking force of the engine brake is high, the request for the braking force of the retarder 23 can be reduces as much. Therefore, a reduction in the electric power energy consumed by the retarder 23 of the electromagnetic type, and suppression of heating of the retarder 23 can be realized. Also, with the combination of the engine brake having the increased braking force with the retarder 23, since the request of the braking force with respect to the main brake can be reduced, the abrasion of brake pads, brake discs, or the brake shoes is suppressed so that the lifetime can be lengthened.

Also, in recent years, an engine with a small displacement may be applied. In this vehicle, when the above brake assist operation is conducted, a reduction in the braking force of the engine brake with a reduction in the engine displacement can be compensated, and the brake assist operation is useful.

Hereinafter, the brake assist operation and the engine assist operation will be described in detail with reference to FIGS. 2-4.

Figure 2:
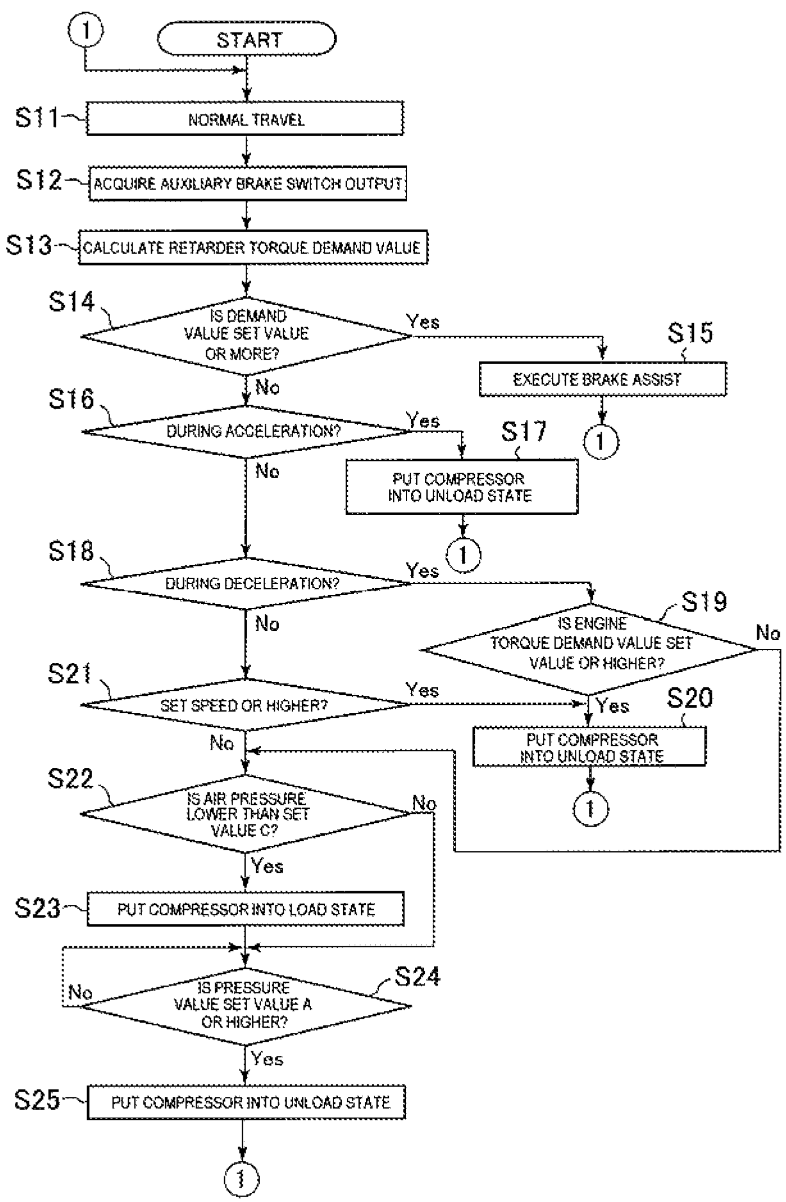
FIG. 2 is a flowchart illustrating the operation of the compressed air supply system.

FIG. 2 is a flowchart illustrating the operation of the compressed air supply system 1.

Prior to the operation described below, a set value for discriminating the retarder torque demand value, a set value for discriminating the engine torque demand value, and set values A, B, and C for discriminating the air pressure within the air dryer module 10 are set in the ECU 2 in advance, and stored in a memory (not shown) built in the ECU 2. The set values A, B, and C related to the air pressure has a relationship of A≥B≥C in the order from a higher pressure side.

While the vehicle is normally traveling (Step S11), the ECU 2 appropriately opens the electromagnetic valve 101 so that the air pressure within the air dryer module 10, which is detected by the pressure sensor 121, falls within a range equal to or higher than the set value A but lower than the set value A, and switches between the load state and the unload state of the compressor 4. For example, when a large amount of compressed air is consumed by the loads 51 to 54, because the air pressure within the air dryer module 10 is reduced, the ECU 2 switches the compressor 4 to the load state so that the air pressure is increased.

During normal travel, the ECU 2 acquires the operation signal 2*b* output from the auxiliary brake switch 22 every given time (Step S12), and calculates the retarder torque demand value on the basis of the operation amount of the auxiliary brake lever (not shown), which is indicated by the operation signal 2*b* (Step S13).

In this situation, the ECU 2 discriminates whether the calculated retarder demand value is the set value or higher, or not (Step S14), and if the demand value is the set value or higher, the ECU 2 executes the brake assist operation (Step S15).

Figure 3:
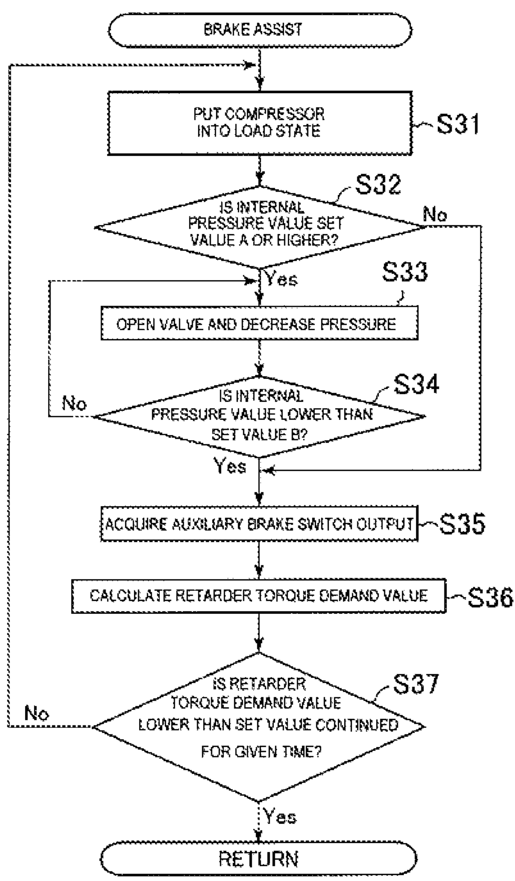
FIG. 3 is a flowchart illustrating the operation of the compressed air supply system.

FIG. 3 is a flowchart illustrating the brake assist operation among the operation of the compressed air supply system 1.

In the brake assist operation, the ECU 2 controls the electromagnetic valve 101, and shifts the compressor 4 to the load state (Step S31). With this operation, because a load for driving the compressor 4 is exerted on the engine 303, the braking force of the engine brake is increased. When the compressor 4 has already been in the load state, the ECU 2 holds the load state of the compressor 4.

Thereafter, the ECU 2 acquires the detected value of the pressure sensor 121, and discriminates whether the air pressure within the air dryer module 10 is the set value A or higher, or not (Step S32). If the air pressure within the air dryer module 10 is the set value A or higher, the ECU 2 controls the electromagnetic valve 102, temporarily opens the exhaust valve 12, and reduces the pressure within the air dryer module 10 (Step S33).

Subsequently, the ECU 2 discriminates whether the air pressure within the air dryer module 10 is lower than the set value B, or not (Step S34), and if the air pressure within the air dryer module 10 is not lower than the set value B, the ECU 2 returns to Step S33, and again opens the exhaust valve 12. Also, if the air pressure within the air dryer module 10 is lower than the set value B, the ECU 2 shifts to subsequent Step S35.

On the other hand, if the air pressure within the air dryer module 10 is not the set value A or higher (no in Step S32), the ECU 2 shifts to Step S35 as it is.

In Step S35, the ECU 2 acquires the operation signal 2*b*, and then calculates the retarder torque demand value on the basis of the operation signal 2*b* (Step S36).

Then, the ECU 2 conducts the discrimination of the calculated retarder torque demand value (Step S37). In this discrimination, the ECU 2 discriminates whether a state in which the retarder torque demand value is lower than the above set value continues for a given time, or longer, or not. If this condition is not satisfied, the ECU 2 returns to Step S31 whereas if this condition is satisfied, the ECU 2 returns to a normal travel state of Step S11 (FIG. 2). With the discrimination in Step S37, the ECU 2 completes the brake assist operation, for example, when the operation amount of the auxiliary brake lever returns to a non-operational state. The reason that the condition in Step S37 is the continuation for the given time or longer is because the frequent switching between the load state and the unload state is prevented from occurring due to the frequent operation of the auxiliary brake lever and a temporal change of the operation signal 2*b*.

Figure 4:
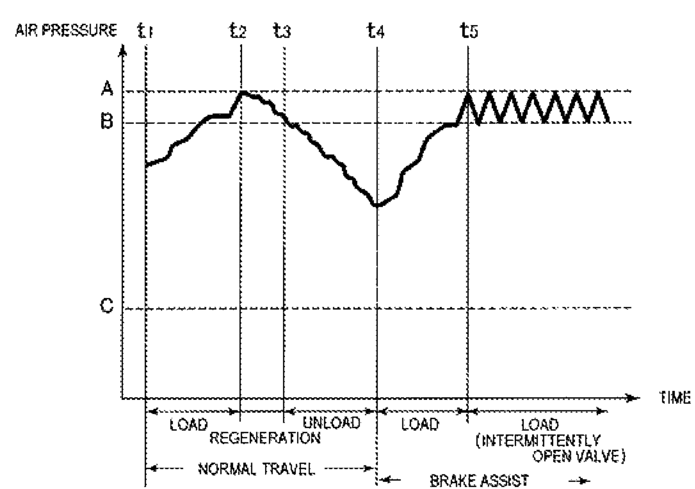
FIG. 4 is a diagram illustrating an example of a change in air pressure due to the operation of the compressed air supply system.

FIG. 4 is a diagram illustrating an example of a change in air pressure within the air dryer module 10 due to the above operation.

The axis of ordinate in a graph shown in FIG. 4 represents the air pressure within the air dryer module 10, which is detected by the pressure sensor 121 (FIG. 1), and the axis of abscissa is an elapsed time.

During a normal travel indicated by times t1 to t4 in FIG. 4, if the air pressure within the air dryer module 10 becomes lower than the set value C under the control of the ECU 2, the compressor 4 switches to the load state. When the air pressure is increased and reaches the set value A, the compressor 4 switches to the unload state. Also, during the normal travel, the exhaust valve 12 is opened under the control of the governor 13 every time the air pressure reaches the set value A, and the above regeneration operation is conducted (times t2 to t3).

Then, when the brake assist operation starts at the time t4, the compressor 4 switches to the load state under the control of the ECU 2.

As described in the flowchart of FIG. 3, during execution of the brake assist operation, since the compressor 4 holds the load state under the control of the ECU 2, the air pressure within the air dryer module 10 is gradually increased, and reaches the set value A. In this state, the ECU 2 opens the exhaust valve 12 for a given time to lower the air pressure in the air dryer module 10 while holding the compressor 4 in the load state. Since the ECU 2 opens the exhaust valve 12 once or several times until the air pressure within the air dryer module 10 becomes lower than the set value B, the air pressure is lowered to the set value B. In this situation, since the compressor 4 holds the load state, the air pressure within the air dryer module 10 is again increased. However, the exhaust valve 12 is intermittently opened under the control of the ECU 2, and the air pressure in the air dryer module 10 is held in a range of from the set value B to the set value A.

In this way, in the brake assist operation, the ECU 2 holds the load state of the compressor 4 while holding the air pressure within the air dryer module 10 in the given range, to thereby increase the braking force of the engine brake.

If the retarder torque demand value is lower than the set value in Step S14 of FIG. 1, the ECU 2 discriminates whether the vehicle is being accelerated, or not, on the basis of the vehicle speed signal 2*a* input from the vehicle speed detector 21 (Step S16). If the vehicle is being accelerated, the ECU 2 puts the compressor 4 into the unload state so as to execute the engine assist operation (Step S17), and returns to Step S11. When the compressor 4 has already been in the unload state in Step S17, the ECU 2 holds the compressor 4 in the unload state, and returns to Step S11.

Also, if the vehicle is not been accelerated (no in Step S16), the ECU 2 discriminates whether the vehicle is being decelerated, or not, on the basis of the vehicle speed signal 2*a* (Step S18), and if the vehicle is being decelerated, the ECU 2 discriminates whether the engine torque demand value calculated on the basis of the vehicle control signal 2*d* is a given set value, or not (Step S19). The engine torque demand value is a value always calculated by the ECU 2 for controlling the engine 303 according to the engine control signal 2*e*. When the engine torque demand value is the set value or higher (yes in Step S19), if the compressor 4 is in the load state, the ECU 2 switches the compressor 4 to the unload state so as to execute the engine assist operation. If the compressor 4 has already been in the unload state, the ECU 2 holds that state (Step S20), and returns to Step S11. Also, if the engine torque demand value is lower than the set value (no in Step 19), the ECU 2 shifts to Step S22 that will be described later.

On the other hand, if the vehicle is not being decelerated (no in Step S18), the ECU 2 discriminates whether the vehicle is a given set speed or higher, or not, on the basis of the vehicle speed signal 2*a* (Step S21), and if the vehicle is the set speed or higher, the ECU 2 shifts the above Step S20. On the contrary, if the vehicle is lower than the set speed, the ECU 2 shifts to Step S22.

In Step S22, the ECU 2 discriminates whether the air pressure detected by the pressure sensor 121 is lower the set value C, or not, and if the air pressure is lower the set value C, the ECU 2 switches the compressor 4 to the load state (Step S23), and shifts to Step S24. Also, if the air pressure is the set value C or higher, the ECU 2 shifts to Step S24 as it is.

In Step S24, the ECU 2 discriminates whether the air pressure detected by the pressure sensor 121 is the set value A or higher, or not, and if the air pressure detected by the pressure sensor 121 is the set value A or higher, the ECU 2 switches the compressor 4 to the unload state (Step S25), and returns to Step S11. Also, if the air pressure is lower than the set value A, the ECU 2 returns to Step S11 as it is.

FIG. 5 is a diagram illustrating a correspondence between the vehicle state and the execution state of the brake assist operation and the engine assist operation in the compressed air supply system 1. The retarder torque demand value according to this preferred embodiment is a negative value because the retarder torque demand value is a value of the torque required for deceleration, which is represented on percentage. The retarder torque demand value is lower as remarkably larger deceleration is required. The maximum value of the retarder torque demand value is indicative of a case in which no deceleration is required, and 0%. The set value is set to, for example, −10%.

As illustrated in FIG. 5, the ECU 2 determines whether the normal travel operation, the brake assist operation, or the engine assist operation is conducted, on the basis of the retarder torque demand value calculated according to the operation signal 2*b* from the auxiliary brake switch 22, the acceleration or deceleration state of the vehicle and the vehicle speed, which are discriminated according to the vehicle speed signal 2*a*, and the engine torque demand value obtained according to the vehicle control signal 2*d*.

If the retarder torque demand value is lower than the set value, that is, if the retarder torque demand value is demanded to be remarkably lower than the set value through the operation of the auxiliary brake lever, the ECU 2 executes the brake assist operation, and forcedly puts the compressor 4 into the load state regardless of the demand amount of compressed air by the loads 51 to 54, and the air pressure within the air dryer module 10.

On the other hand, if the retarder torque demand value is the set value or higher, the acceleration or deceleration state of the vehicle and the vehicle speed are discriminated, and if the vehicle speed is low (for example, lower than 50 km/h) when the vehicle is not accelerated and decelerated, the compressor 4 is controlled for the normal travel. On the other hand, if the vehicle speed is high (for example, than 50 km/h or higher) while the vehicle is not being accelerated, and not accelerated and decelerated, the engine assist operation is conducted, and the compressor 4 is forcedly put into the unload state for reducing the load of the engine 303. Since the main brake is not frequently used during high-speed travel and acceleration, the compressor 4 may be put into the unload state without any problem.

Also, during deceleration of the vehicle, the engine torque demand value is discriminated, and if the engine torque demand value is the set value or higher, the output of the engine 303 is demanded. Therefore, the engine assist operation is conducted, and the compressor 4 is forcedly put into the unload state. On the contrary, if the engine torque demand value is lower than the set value, the control during the normal travel is conducted.

In this way, the compressed air supply system 1 includes the compressor 4 driven by the engine 303, the air dryer module 10 that supplies the compressed air discharged from the compressor 4 to the loads 51 to 54 of the vehicle, and the ECU 2 that switches between the load state and the unload state of the compressor 4 according to the demands of the loads 51 to 54. When the vehicle requires the braking force, the ECU 2 conducts the brake assist operation for putting the compressor 4 into the load state regardless of the demand for the compressed air by the loads 51 to 54 and the air pressure within the air dryer module 10. As a result, when the vehicle requires the braking, the compressor 4 is put into the load state to exert the load on the engine 303 so as to increase the braking force of the engine brake. Therefore, the compressor 4 is used as the auxiliary brake device so that the load on the main brake device or the retarder 23 of the vehicle can be reduced. Furthermore, the abrasion of the brake pads, the brake discs, or the brake shoes which configure the main brake device can be suppressed, the main brake device and the retarder 23 can be prevented from being heated, and the lifetime of those parts can be lengthened.

Further, in the brake assist operation, the compressor 4 is loaded by the rotating force of the engine 303 during the operation of the engine brake. That is, since the kinetic energy of the vehicle that is being traveling is regenerated to produce the compressed air, the use efficiency of the energy in the vehicle can be enhanced.

Also, the pressure sensor 121 is provided which detects the air pressure in the air dryer module 10, and outputs the air pressure to the ECU 2. The ECU 2 switches between the load state and the unload state of the compressor 4 so that the air pressure detected by the pressure sensor 121 becomes the set value C or higher, but lower than the set value A during the normal travel. When the vehicle requires the braking force, the brake assist operation is conducted. Therefore, in the normal state, while the compressed air is stably supplied, the brake assist operation is conducted only when the braking force is required. Thus, the braking force can be efficiently enhanced.

Further, the ECU 2 holds the compressor 4 in the load state in the brake assist operation, and opens the exhaust valve 12, thereby enabling the air pressure in the air dryer module 10 to be held within an appropriate range.

Also, the ECU 2 obtains the retarder torque demand value on the basis of the operation signal 2*b* from the auxiliary brake switch 22, which is indicative of the operation amount of the auxiliary brake lever, and discriminates whether the brake assist operation is conducted, or not, with reference to the retarder torque demand value. For that reason, when the braking force of the vehicle is not required, or when the braking force required by the operation of the auxiliary brake lever is small, the brake assist operation is not conducted. As a result, since the useless brake assist operation can be prevented, for example, since the brake assist operation is not conducted during acceleration, the consumption of fuel is not increased by the brake assist operation, resulting in no risk that the efficiency of the fuel consumption is deteriorated.

Further, the ECU 2 conducts the engine assist operation while the torque of the engine 303 is demanded such as during acceleration of the vehicle or during high-speed travel, and holds the compressor 4 in the unload state. Therefore, the vehicle can exert the high acceleration performance. Also, because the sufficient acceleration performance is obtained even if an acceleration opening is suppressed, the fuel efficiency can be improved due to the suppression of the acceleration opening.

The above-described preferred embodiment shows one mode of the present invention, and the present invention is not limited to the above preferred embodiment. For example, in the above preferred embodiment, the retarder torque demand value is obtained according to the operation signal 2*b* of the auxiliary brake switch 22, and it is discriminated whether the vehicle requires the braking force, or not, on the basis of the retarder torque demand value. However, the present invention is not limited to this configuration. For example, a pedal force or the depressing amount of the brake pedal may be detected, and it may be discriminated whether the vehicle requires the braking force, or not, on the basis of the detected value. Also, it may be discriminated whether the vehicle requires the braking force, or not, on the basis of a state of a clutch of the vehicle, or the operating state of the speed gear. A dedicated switch for instructing the ECU 2 to conduct the brake assist operation may be provided, and it may be determined that the vehicle requires the braking force according to the operation of the switch, and the brake assist operation may be executed.

Further, in the above preferred embodiment, the ECU 2 outputs the retarder control signal 2*c* to the retarder 23 on the basis of the retarder torque demand value to conduct the braking by the retarder 23. For example, the enhancement of the engine brake by the brake assist operation may be added, a demand value higher than the calculated retarder torque demand value may be output to the retarder 23 as the retarder control signal 2*c*, and a lower braking force may be obtained by the retarder 23. Also, in the above preferred embodiment, the braking of the retarder 23 may be interlocked with the operation of the engine brake, and in this case, an exhaust brake valve (not shown) disposed in the engine 303 may be closed in interlocking therewith.

Also, in the above preferred embodiment, when the demand value of the torque to the engine is the set value or higher during acceleration of the vehicle, during high-speed travel, and during deceleration, the engine assist operation is conducted as one example. However, the present invention is not limited to this configuration. The engine assist operation may be conducted during only any one of acceleration and high-speed travel, or the engine assist operation may be conducted on the basis of only the engine torque demand value.

Second Preferred Embodiment

Figure 6:
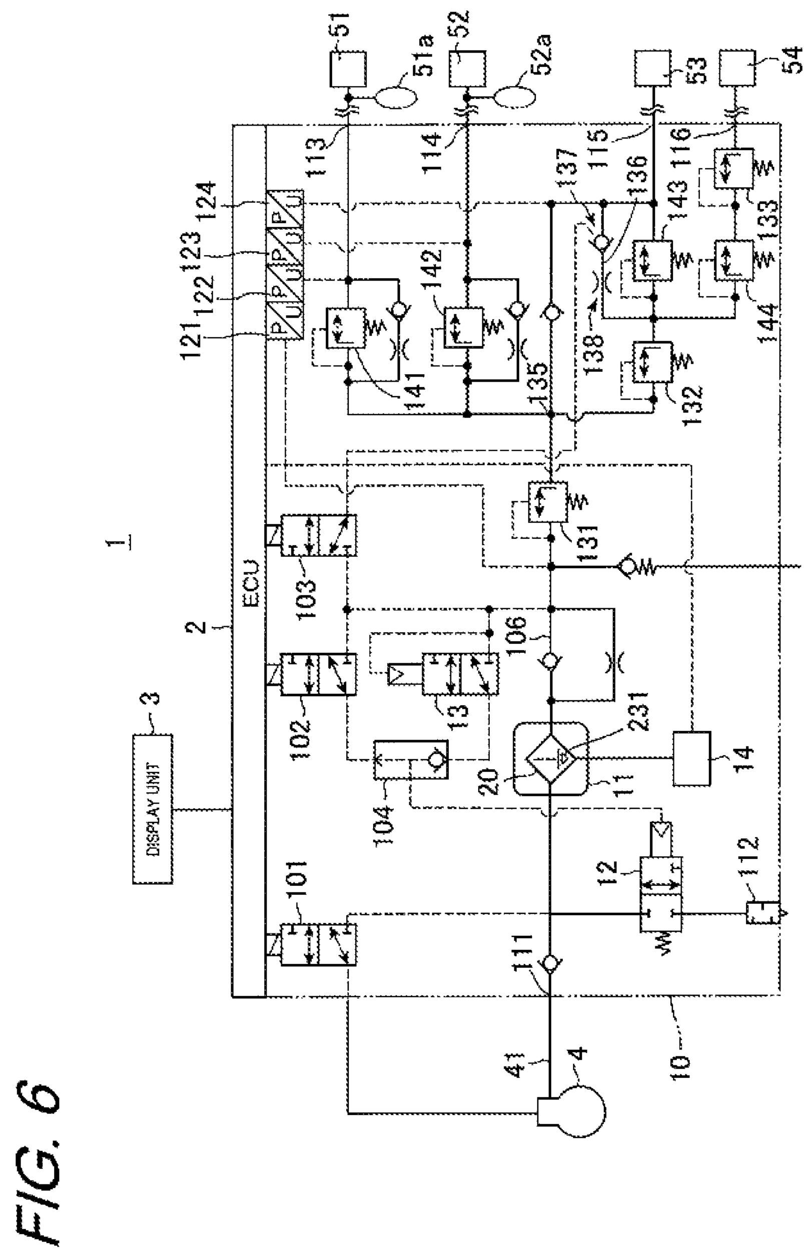
FIG. 6 is a diagram illustrating a configuration of a compressed air supply system according to a second preferred embodiment of the present invention.

FIG. 6 is a diagram illustrating a configuration of a compressed air supply system 1 according to a second preferred embodiment of the present invention.

In the second preferred embodiment, the respective parts identical with those in the first preferred embodiment are denoted by the same references, and their description will be omitted.

The compressed air supply system 1 (compressed air supply device for a vehicle) illustrated in FIG. 6 includes a compressor 4 (air compressor), an ECU 2 that controls the compressor 4, and an air dryer module 10 that removes moisture in a compressed air discharged from the compressor 4, and supplies the compressed air to a load of the vehicle.

The ECU 2 controls an engine of the vehicle and also controls the operation of the compressor 4 and the air dryer module 10, on the basis of the speed of the vehicle in which the compressed air supply system 1 is mounted.

The air dryer module 10 is connected with loads 51 to 54 provided in the vehicle. The load 51 is a main brake (front wheels), the load 52 is another main brake (rear wheels), the load 53 is a parking brake, and the load 54 is an accessory type such as a horn or a clutch driving mechanism, which is driven by the compressed air. Each of the loads 51 to 54 includes a compressed air circuit in which the compressed air flows. Further, the load 51 has an air tank 51*a*, and the load 52 has an air tank 52*b*.

The air dryer module 10 includes electromagnetic valves 101, 102, 103 which are opened or closed under the control of the ECU 2, and pressure sensors 121, 122, 123, 124 that detect air pressures in the respective parts of the air dryer module 10, and outputs detected values to the ECU 2. The ECU 2 opens and closes the electromagnetic valves 101 to 103 on the basis of the detected values of the pressure sensors 121 to 123.

The compressor 4 is coupled to the engine through an accessory belt not shown, and compresses air by a driving force of the engine. The compressor 4 is controlled by an air pressure, and its control line is connected with the electromagnetic valve 101, and the compressor 4 is switched between a load state in which the compressor 4 compresses air and an unload state in which the compressor 4 does not compress air by opening or closing the electromagnetic valve 101.

A discharge pipe 41 of the compressor 4 is connected to an inflow pipe 111 of the air dryer module 10, and the inflow pipe 111 is connected with an air dryer 11. The air dryer 11 accumulates a drying agent 231 in a case 20, and removes moisture included in the compressed air discharged from the compressor 4 by the drying agent 231.

The air dryer 11 is equipped with an exhaust valve 12, and when the exhaust valve 12 is opened, the compressed air within the main body of the air dryer 11 is exhausted from an exhaust port 112 directly to the external. The exhaust valve 12 is controlled by the air pressure, and its control line is connected with a double check valve 104. The exhaust valve 12 is normally closed, and opened only when an air pressure is applied from the double check valve 104 thereto.

The air dryer module 10 includes a governor 13 that mechanically operates by the air pressure to control the open/close operation of the exhaust valve 12. The governor 13 operates according to the air pressure in a supply channel 106 downstream of the dryer 11, and supplies the air compressor to the double check valve 104 when the air pressure exceeds a given value.

On the other hand, the electromagnetic valve 102 is opened and closed under the control of the ECU 2, and supplies the air pressure of the supply channel 106 to the double check valve 104 in an open state.

When any one of the governor 13 and the electromagnetic valve 102 is opened, the double check valve 104 supplies the air pressure to the exhaust valve 12 to open the exhaust valve 12. Accordingly, when the air pressure in the supply channel 106 is higher than the given value, and when the electromagnetic valve 102 is opened, the exhaust valve 12 is opened, and discharges the compressed air from the exhaust port 112.

In this example, when the exhaust valve 12 is opened in a state where the air pressure within the air dryer module 10 is sufficiently high, the compressed air downstream of the air dryer 11 flows backward within the case 20 of the air dryer 11, and is discharged from the exhaust port 112. In this situation, air passing through the case 20 becomes super-dried by a rapid pressure reduction, and the moisture is taken from the drying agent 231 in the case 20. Therefore, the drying agent 231 is regenerated. The regenerated drying agent 231 recovers the adsorption performance for adsorbing moisture so as to remove the moisture in the compressed air. The regenerating operation is executed by opening the electromagnetic valve 102 by the ECU 2 every given time, or when the air pressure within the air dryer module 10 meets a given condition.

The air dryer module 10 includes an output port 113 connected with the load 51 (main brake of the front wheels), an output port 114 connected with the load 52 (main brake of the rear wheels), an output port 115 connected with the load 53 (parking brake), and an output port 116 connected with the load 54 (accessory type).

The supply channel 106 downstream of the air dryer 11 is connected with a branch chamber 135 through a pressure reducing valve 131. The branch chamber 135 is connected with a supply channel connected to the output port 113 and a supply channel connected to the output port 114. The supply channel connected to the output port 113 is equipped with a protection valve 141, and a supply channel connected to the output port 114 is equipped with a protection valve 142. Also, the branch chamber 135 is connected with a pressure reducing valve 132, and a downstream of the pressure reducing valve 132 is branched into a supply channel connected to the output port 115 and a supply channel connected to the output port 116, which are equipped with protection valves 143 and 144, respectively. The respective protection valves 141 to 144 are arranged in parallel to a throttle and a check valve, and are closed when the circuits in which the compressed air flows are lost in the loads 51 to 54 connected to the output ports 113 to 116, respectively.

The protection valves 141 and 142 are opened when the compressed air circuits of the corresponding loads 51 and 52 are fully filled with the compressed air. Accordingly, the compressed air of the air tanks 51*a* and 52*a* for the main brake can pass through the pressure reducing valve 132 from the branch chamber 135, and be supplied to the output port 115 through the supply channel 136. For that reason, in a state where the air pressures in the air tanks 51*a* and 52*a* are sufficiently high, the parking brake can be released by supplying the compressed air to the load 53. On the other hand, when the air pressures in the air tanks 51*a* and 52*a* are insufficiently, the ECU 2 opens the electromagnetic valve 103. An instructed pressure of the electromagnetic valve 103 is given to the check valve 137, the supply channel 136 is closed by the check valve 137, and the supply channel of the compressed air to the output port 115 is interrupted. In this case, the parking brake cannot be released. However, when the air pressures in the air tanks 51*a* and 52*a*, which are used for the main brake are insufficient, it is preferable that the parking brake is not released. Also, when the air pressures in the air tanks 51*a* and 51*b* are recovered, the parking brake can be released. Accordingly, even if there is no air tank for the load 53, the parking brake can be stably operated by the compressed air.

Further, the compressed air supply system 1 illustrated in FIG. 6 includes an oil detection sensor 14 that detects oil in the air dryer 11.

The drying agent 231 of the air dryer 11 is deteriorated with use, and the adsorption performance after regeneration has been conducted is gradually deteriorated. When the adsorption performance of the drying agent 231 becomes insufficient, the drying agent 231 is replaced with fresh one. However, from the viewpoints of the costs and man-hour, it is desirable to minimize the replacement frequency with determination of appropriate replacement timing. Under the circumstances, in the compressed air supply system 1 according to the second preferred embodiment, the oil detection sensor 14 is disposed in the air dryer module 10, and oil within the case 20 is detected by the oil detection sensor 14 so that the replacement timing of the drying agent 231 can be determined on the basis of the detection result.

That is, the present inventors have obtained knowledge that when a compressor oil that flows from the discharge pipe 41 of the compressor 4 into the air dryer 11 is adhered to a surface of the drying agent 231, the adsorption performance on the surface of the drying agent 231 is deteriorated. On the basis of this knowledge, oil that has flown into the case 20 is detected to detect a state of the drying agent 231, so to speak, directly. According to this configuration, when the oil that has flown into the case 20 is detected, an adhesion state of the oil on the surface of the drying agent 231 can be detected, and therefore the degree of deterioration of the drying agent 231 can be appropriately determined.

In the compressed air supply system 1 of FIG. 6, the oil detection sensor 14 is connected to the ECU 2, a signal representative of the detection result of detecting the oil in the oil detection sensor 14 is input to the ECU 2, and the ECU 2 acquires the detection result on the basis of the input signal. Further, the ECU 2 is equipped with a display unit 3 (output unit) that displays the detection result of the oil detection sensor 14. As specific configurations of the display unit 3, there are an LED that switches lighting, extinction, and blinking according to the detection result, and a liquid display panel that displays the detection result by characters and signs. The display unit 3 may be implemented together with a speed meter of the vehicle, or may be disposed in the vicinity of the compressor 4 or the dryer 11 in the vehicle. The display unit 3 enables a driver, a mechanic that overhauls the vehicle, or a manger who manages the vehicle to view a detection state of the oil in the case 20, and to appropriately determine the replacement time of the drying agent 231. For example, a recommendation of replacement of the drying agent 231 is displayed on the display unit 3, and the drying agent 231 is replaced with fresh one on the basis of the display.

Figure 7:
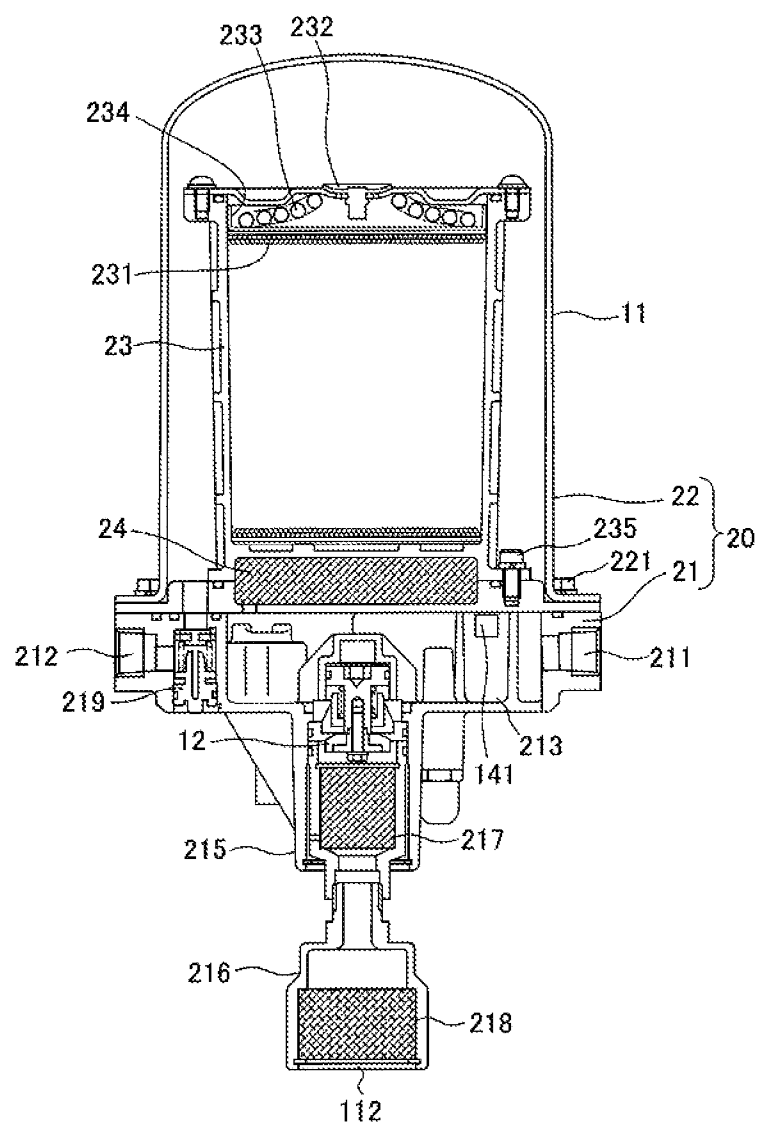
FIG. 7 is a cross-sectional view illustrating a configuration of an air dryer.

FIG. 7 is a cross-sectional view illustrating a specific configuration example of the air dryer 11.

FIG. 7 illustrates a configuration in which an oil mist sensor 141 is disposed as one specific example of the oil detection sensor 14 (FIG. 6). As illustrated in FIG. 7, the case 20 of the dryer 11 includes a dryer main body 21, and a cartridge cover 22 that covers the driver main body 21 and is fixed to the dryer main body 21 with bolts 221. The dryer main body 21 includes an inlet 211 which is connected to an inflow pipe 111 (FIG. 6), and into which the compressed air discharged from the discharge pipe 41 of the compressor 4 flows, and the supply channel 106 (FIG. 6) from the case 20.

The hollow cartridge cover 22 fixed to an upper portion of the dryer main body 21 houses a cartridge 23. The cartridge 23 is fixed to the dryer main body 21 with bolts 235 so that the compressed air is not leaked to the outside of the cartridge 23.

A space is formed in the interior of the cartridge 23, and the space is filled with the grained drying agent 231. Also, an upper end of the cartridge 23 is equipped with a check valve 232 that exhausts the compressed air to the outside of the cartridge 23. A filter 234 and a spring 233 which press the drying agent 231 from the check valve 232 side are disposed below the check valve 232.

Also, an oil filter 24 that collects oil mist in the circulating air is disposed below the cartridge 23 for the purpose of preventing the oil from entering the space in which the drying agent 231 is accumulated.

The compressed air that has flown from the inlet 211 of the drying agent 231 enters an inflow air chamber 213 (introduction part) disposed in the dryer main body 21, and flows into the cartridge 23 through a flow channel (not shown) formed in the dryer main body 21. The flow channel within the dryer main body 21 is connected to the oil filter 24, and the compressed air that has passed through the oil filter 24 arrives at the drying agent 231.

Then, the compressed air from which the oil is removed by the oil filter 24, and the moisture is adsorbed and removed by the drying agent 231 exits to the outside of the cartridge 23 through the check valve 232, and flows to the outside of the dryer main body 21 from an outlet 212 through a flow channel (not shown) disposed within the cartridge cover 22.

In the dryer main body 21, the exhaust valve 12 is disposed in a flow channel in which the compressed air flows from the inlet 211 to the cartridge 23. The exhaust valve 12 is a valve for exhausting the compressed air within the case 20 to the external as described above. An exhaust pipe 215 is connected to a lower portion of the exhaust valve 12, and a silencer 217 is contained within the exhaust pipe 215. Also, a collar 216 is coupled to a lower end of the exhaust pipe 215, and a silencer 218 is contained in the interior of the collar 216. When the exhaust valve 12 is opened through the above-mentioned regenerating operation, the compressed air within the case 20 passes through the exhaust pipe 215 and the collar 216, and is exhausted from the exhaust port 112 opened at a lower end of the collar 216. In this case, since the compressed air is roundly exhausted to the external air, airflow sound is suppressed by the silencers 217 and 218 so as not to bring large noise to the environment.

In the configuration illustrated in FIG. 7, the oil mist sensor 141 is disposed in the inflow air chamber 213. The oil mist sensor 141 is a sensor that optically measures the concentration of oil droplets (oil mist) floating within the inflow air chamber 213. More specifically, the oil mist sensor 141 includes a light emitting part such as an LED, a light receiving part (not shown) that receives a light omitted from the light emitting part, and a signal output part (not shown) that outputs a detection signal indicative of the amount of light received by the light receiving part. The oil mist sensor 141 measures the concentration of oil mist in the compressed air that flows from the inlet 211 and is accumulated in the inflow air chamber 213 once, and outputs a signal indicative of a measured value to the ECU 2 (FIG. 6).

The ECU 2 calculates an integrated value of the concentration of oil mist on the basis of a signal input from the oil mist sensor 141, and displays the output on the display unit 3 according to the integrated value within a given time.

As modes of the output display, for example, there are a mode in which the measured value of the oil mist sensor 141 is displayed by a numerical value or a bar graph, and a mode in which when the measured value of the oil mist sensor 141 exceeds a given threshold value, a warning is displayed by display of a sign or lighting or blinking of an LED.

As a preferable example, the ECU 2 displays the output on the display unit 3 when the integrated value of the concentration of oil mist within a given time exceeds a given threshold value. In this case, the threshold value is a value set in advance as the integrated value of oil mist corresponding to a case in which the adsorption performance of the drying agent 231 is deteriorated by oil mist. This threshold is, for example, stored in a memory built in the ECU 2.

In this way, the compressed air supply system 1 includes the compressor 4 mounted in the vehicle. The air dryer module 10 that supplies the compressed air discharged from the compressor 4 to the loads of the vehicle is connected to the compressor 4, the discharge line of the compressor 4 is provided with the air dryer 11 that removes a foreign material such as moisture included in the compressed air, the oil detection sensor 14 is disposed in the air dryer 11, and the display unit 3 that outputs the detection result of the oil detection sensor 14 is provided. Therefore, when the oil that has flown into the air dryer 11, the adhesion state of the oil on the surface of the drying agent 231 can be directly detected. When the detection result is output, the driver and the mechanic of the vehicle can accurately know the degree of deterioration of the drying agent 231 which is caused by the adhesion of oil, appropriately determine whether the drying agent 231 should be replaced with fresh one, or not, and replace the drying agent 231 with the fresh one in appropriate timing.

Also, since the oil detection sensor 14 is disposed within the case 20 of the air dryer 11, the oil that has flown into the air dryer 11 can be surely detected.

Furthermore, since the oil detection sensor 14 is installed in the inflow air chamber 213 in the vicinity of the introduction part which introduces the compressed air into the drying agent 231 provided in the air dryer 11, the oil that flows into the case 20 from the external, and causes the deterioration of the drying agent 231 can be surely detected.

Furthermore, in the compressed air supply system 1, since the oil detection sensor 14 is configured by the oil mist sensor 141 that detects the oil mist concentration, the misty oil that has flown into the case 20 can be surely detected.

Third Preferred Embodiment

Figure 8:
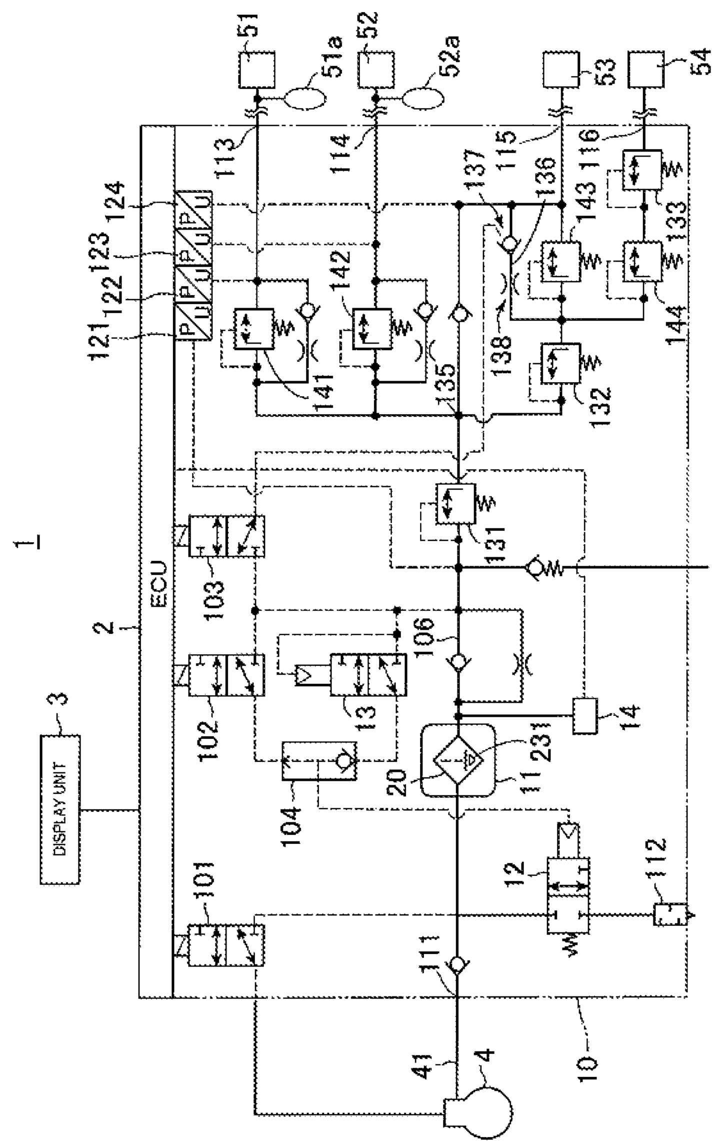
FIG. 8 is a diagram illustrating a configuration of a compressed air supply system according to a third preferred embodiment of the present invention.

FIG. 8 is a diagram illustrating a configuration of a compressed air supply system 1 according to a third preferred embodiment.

In the third preferred embodiment, the respective parts identical with those in the second preferred embodiment are denoted by the same references, and their description will be omitted.

In the compressed air supply system 1 of the third preferred embodiment, unlike the above-mentioned second preferred embodiment, the oil detection sensor 14 is disposed in a pipe for the compressed air, which is connected to a downstream side of the air dryer 11.

That is, the oil detection sensor 14 is located outside the case 20 of the air dryer 11, and detects the amount of oil mist in the compressed air that has passed through the drying agent 231 within the case 20. The oil detection sensor 14 is configured by, for example, an oil mist sensor 141 described in the second preferred embodiment, which is connected to the ECU 2, measures the concentration of the oil mist in the pipe, and outputs a signal indicative of the measurement value to the ECU 2.

In the third preferred embodiment, the ECU 2 outputs the signal to the display unit 3 on the basis of the information or signal input from the oil detection sensor 14. There are various specific output modes as described in the second preferred embodiment. As a preferable example, the ECU 2 displays the output on the display unit 3 when the concentration of oil mist within a given time exceeds a given threshold value.

As described above, when the compressor oil is adhered to the drying agent 231, the adsorption of moisture on the surface of the drying agent 231 is blocked, as a result of which the adsorption performance of the drying agent 231 is deteriorated. When this deterioration is advanced, since the compressed air that has passed through the retarder 23 is mixed with the compressor oil adhered to the drying agent 231, the oil is detected as the oil mist by the oil detection sensor 14 disposed downstream. Under the circumstances, in the third preferred embodiment, whether the concentration of oil mist detected by the oil detection sensor 14 exceeds a given threshold value, or not, is discriminated by the ECU 2, and the discrimination result is displayed on the display unit 3. The threshold value is, for example, stored in a memory built in the ECU 2.

According to the third preferred embodiment, the state of the drying agent 231 can be detected directly according to the amount of compressor oil mixed with the compressed air downstream of the air dryer 11, and the detected state of the drying agent 231 can be output. Also, since the compressor oil that is not normally leaked downstream of the drying agent 231 is detected by the oil detection sensor 14 disposed downstream of the drying agent 231, the state of the drying agent 231 can be detected surely and with high precision. Further, since the oil detection sensor 14 measures the oil mist in the compressed air that has passed through the oil filter 24 and the drying agent 231, the measurement value is equal to the amount of oil directly observed, which is really adhered to the drying agent 231. For that reason, when the oil detection sensor 14 is disposed downstream of the drying agent 231, the state of the drying agent 231 can be directly detected.

In the third preferred embodiment, as illustrated in FIG. 8, the oil detection sensor 14 is disposed in the pipe immediately downstream of the air dryer 11. However, the position of the oil detection sensor 14 is not particularly limited if the position is downstream of the drying agent 231 of the air dryer 11. For example, the oil detection sensor 14 (oil mist sensor 141) may be disposed in the vicinity of the outlet 212 (FIG. 7) of the air dryer 11, or the oil detection sensor 14 may be disposed in the supply channel 106 or an air tank (not shown) disposed in the supply channel 106.

Also, in the above first and third preferred embodiments, the oil detection sensor 14 is exemplified by the oil mist sensor 141. For example, a sensor that detects a contact with liquid oil may be disposed.

Hereinafter, this case will be described as a fourth preferred embodiment.

Fourth Preferred Embodiment

Figure 9:
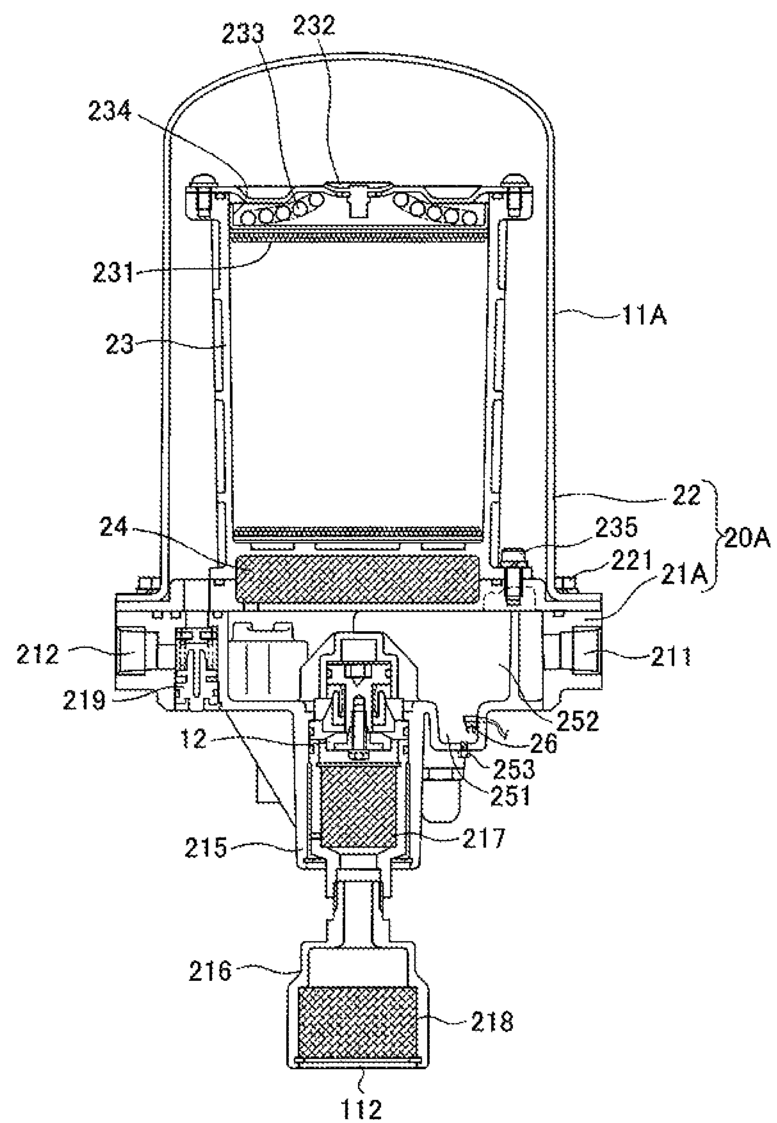
FIG. 9 is a cross-sectional view illustrating a configuration of an air dryer according to a fourth preferred embodiment of the present invention.

FIG. 9 is a cross-sectional view illustrating a configuration example of an air dryer 11A according to the fourth preferred embodiment. In the fourth preferred embodiment, the respective parts identical with those in the second preferred embodiment are denoted by the same references, and their description will be omitted.

The air dryer 11A illustrated in FIG. 9 is a device used instead of the above-mentioned air dryer 11. The air dryer 11A has a case 20A configured by fixing the cartridge cover 22 to a dryer main body 21A. The compressed air flowing from the inlet 211 disposed in the dryer main body 21A is allowed to pass through the cartridge 23 within the cartridge cover 22 to remove moisture in the compressed air. Also, the oil filter 24 is disposed in a flow passage of the compressed air, which extends from the inlet 211 to the cartridge 23, and the oil contained in the compressed air is collected by the oil filter 24.

An oil pan 251 (oil pool part) is disposed in the dryer main body 21A of the air dryer 11A. The oil pan 251 is located below the oil filter 24, and a recess that pools the oil that has been collected by the oil filter 24 and dropped. The oil pan 251 is formed at a lower part of an inflow air chamber 252 that accumulates the compressed air that has flown from the inlet 211. A drain bolt 253 is disposed in a bottom of the oil pan 251, and the drain bolt 253 is released to enable the oil on the oil pan 251 to be exhausted.

An oil level detection sensor 26 that detects that a fluid level of the oil pooled in the oil pan 251 is raised to a given position is disposed in the oil pan 251. The oil level detection sensor 26 is a sensor corresponding to the oil detection sensor 14 illustrated in FIG. 6.

Figure 10:
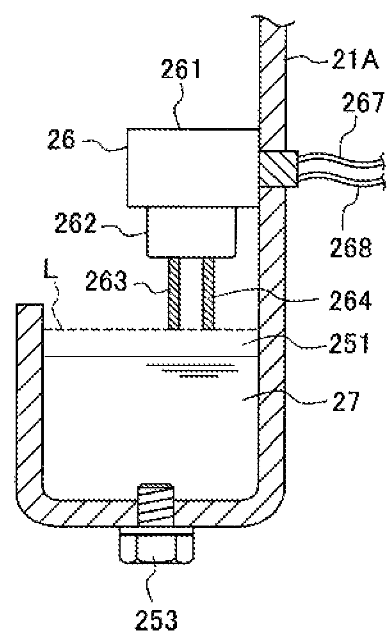
FIG. 10 is an enlarged cross-sectional view illustrating a main portion of a configuration of an oil level detection sensor in detail.

FIG. 10 is an enlarged cross-sectional view illustrating a main portion of a configuration of the oil level detection sensor 26 in detail.

The oil level detection sensor 26 includes a substantially-boxy sensor main body 261, and an electrode support 262 made of insulator, and two electrodes 263 and 264 are erected from the electrode support 262. The electrodes 263 and 264 are each formed of a bar-shaped conductor, and extend in parallel downward at a given distance. A detector circuit (not shown), which detects that the electrodes 263 and 264 are rendered conductive on the basis of an electric resistance value between the electrodes 263 and 264, is built in the sensor main body 261. Also, the sensor main body 261 is connected with leads 267 and 268 that penetrate through a wall of the dryer main body 21A and extend to the external, and those leads 267 and 268 are connected to the ECU 2 (FIG. 1).

While the oil that has dropped from the oil filter 24 is pooled in the oil pan 251, the oil level detection sensor 26 monitors an electric resistance value between the electrodes 263 and 264. When the fluid level of an oil 27 is raised up to a position L in the figure, both of the electrodes 263 and 264 are immersed in the oil 27, and the electric resistance value is remarkably changed. Accordingly, the oil level detection sensor 26 detects that the fluid level of the oil 27 is raised up to the position L on the basis of the electric resistance value between the electrodes 263 and 264, and outputs the detection result to the ECU 2 through the leads 267 and 268.

In this case, the amount of oil included in the compressed air that has flown from the inlet 211 to the drying agent 231 can be directly detected, and the adhesion state of the oil on the surface of the drying agent 231 can be directly detected. Then, the detection result is output from the display unit 3 by the ECU 2 whereby the driver and the mechanic of the vehicle can accurately know the degree of deterioration of the drying agent 231, which is caused by adhesion of the oil, and whether the drying agent 231 should be replaced with fresh one, or not, can be appropriately determined.

Also, since the oil level detection sensor 26 having the electrodes 263 and 264 is disposed in the oil pan 251 disposed on the bottom of the case 20A in the air dryer 11, and the height of the fluid level of the oil 27 is detected by the oil level detection sensor 26, the amount of oil can be surely detected.

In the fourth preferred embodiment, instead of a configuration in which the oil level detection sensor 26 monitors the electric resistance value between the electrodes 263 and 264, the electrode 263 and the lead 267 are connected to each other, and the electrode 264 and the lead 268 are connected to each other so that the electric resistance value between the electrodes 263 and 264 may be detected in the ECU 2.

Also, the above-described respective preferred embodiments show modes for carrying out the present invention, and the present invention is not limited to those preferred embodiments. For example, in the above preferred embodiments, the protection valve 141 and the oil level detection sensor 26 as the oil detection sensor 14 are disposed inside the cases 20 and 20A, respectively. However, the present invention is not limited to this configuration, but the oil detection sensor 14 may be disposed inside the inflow pipe 111, and the location position is not particularly limited if the oil included in the compressed air flowing toward the drying agent 231 can be detected. Also, in the above preferred embodiments, the display unit 3 that outputs the detection result of the oil detection sensor 14 is exemplified. However, the output mode can be arbitrarily changed. For example, the detection result of the oil detection sensor 14 may be output by voice or the operation or position of a structure. A signal indicative of the detection result of the oil detection sensor 14 may be output from the ECU 2 to an external device in a wired or wireless manner. When a printer is connected to the ECU 2, the detection result of the oil detection sensor 14 may be printed under the control of the ECU 2. Further, in the above preferred embodiments, the oil detection sensor 14 is exemplified by the protection valve 141 and the oil level detection sensor 26. In addition, the compressed air that flows into the case 20A is sucked, and the oil in the compressed air is collected by a filter, and a sensor that detects the amount of collected oil can be used as the oil detection sensor 14, and is not particularly limited if the oil can be detected.

Fifth Preferred Embodiment

Figure 11:
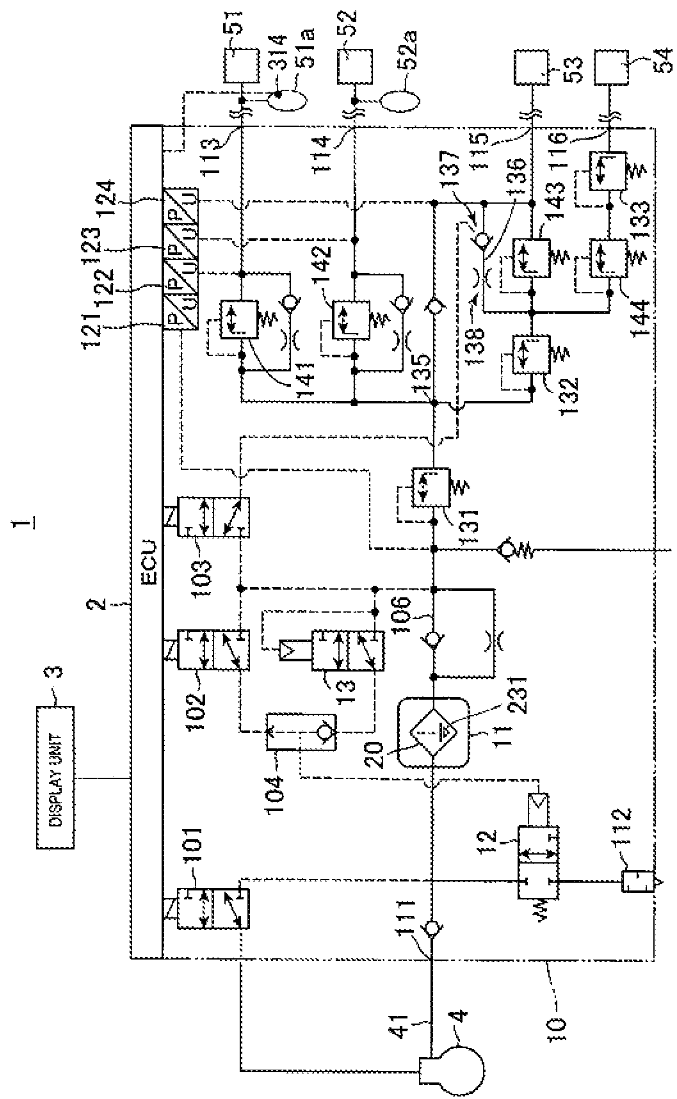
FIG. 11 is a diagram illustrating a configuration of a compressed air supply system according to a fifth preferred embodiment of the present invention.

FIG. 11 is a diagram illustrating a configuration of a compressed air supply system 1 according to a fifth preferred embodiment of the present invention. In the fifth preferred embodiment, the respective parts identical with those in the first preferred embodiment are denoted by the same references, and their description will be omitted.

The ECU 2 controls the operation of the engine in the vehicle, and also controls the operation of the compressor 4 and the air dryer module 10, on the basis of the vehicle speed of the vehicle in which the compressed air supply system 1 is mounted. The ECU 2 receives information related to a travel status of the vehicle such as information related to the vehicle speed of the vehicle and information related to a travel distance of the vehicle. Also, the ECU 2 receives information related to the operation status of the air dryer 11.

The air dryer module 10 is connected with loads 51 to 54 provided in the vehicle. The load 51 is a main brake (front wheels), the load 52 is another main brake (rear wheels), the load 53 is a parking brake, and the load 54 is an accessory type such as a horn or a clutch driving mechanism, which is driven by the compressed air. Each of the loads 51 to 54 includes a compressed air circuit in which the compressed air flows. Further, the compressed air that is supplied to the load 51 is accumulated in an air tank 51*a*, and the compressed air that is supplied to the load 52 is accumulated in an air tank 52*a*.

The air dryer module 10 includes electromagnetic valves 101, 102, 103 which are opened or closed under the control of the ECU 2, and pressure sensors 121, 122, 123, 124 that detect air pressures in the respective parts of the air dryer module 10, and outputs detected values to the ECU 2. The ECU 2 opens and closes the electromagnetic valves 101 to 103 on the basis of the detected values of the pressure sensors 121 to 123.

The compressor 4 is coupled to the engine through an accessory belt not shown, and compresses air by a driving force of the engine. The compressor 4 is controlled by an air pressure, and its control line is connected with the electromagnetic valve 101, and the compressor 4 is switched between a load state in which the compressor 4 compresses air and an unload state in which the compressor 4 does not compress air by opening or closing the electromagnetic valve 101.

A discharge pipe 41 of the compressor 4 is connected to an inflow pipe 111 of the air dryer module 10, and the inflow pipe 111 is connected with an air dryer 11. The air dryer 11 accumulates a drying agent 231 in a case 20, and removes moisture included in the compressed air discharged from the compressor 4 by the drying agent 231.

The air dryer 11 is equipped with an exhaust valve 12, and when the exhaust valve 12 is opened, the compressed air within the main body of the air dryer 11 is exhausted from an exhaust port 112 directly to the external. The exhaust valve 12 is controlled by the air pressure, and its control line is connected with a double check valve 104. The exhaust valve 12 (exhaust valve) is normally closed, and opened only when an air pressure is applied from the double check valve 104 thereto.

In this example, when the exhaust valve 12 is opened in a state where the air pressure within the air dryer module 10 is sufficiently high, the compressed air accumulated downstream of the air dryer 11, for example, within the air tanks 51*a* and 52*a* flows backward within the case 20 of the air dryer 11, and is discharged from the exhaust port 112. In this situation, air passing through the case 20 becomes superdried by a rapid pressure reduction, and the moisture is taken from the drying agent 231 in the case 20. Therefore, the drying agent 231 is regenerated. The regenerated drying agent 231 recovers the adsorption performance for adsorbing moisture so as to remove the moisture in the compressed air. The regenerating operation is executed by opening the electromagnetic valve 101 and the electromagnetic valve 102 by the ECU 2. The regenerating operation of the drying agent 231 is conducted every given regeneration interval (T0). As will be described later, the regeneration interval (T0) is updated to an appropriate interval according to the state of the drying agent 231.

The output port 113 is connected with the air tank 51*a*, and the output port 114 is connected with the air tank 52*a*.

The supply channel 106 downstream of the air dryer 11 is connected with a branch chamber 135 through a pressure reducing valve 131. The branch chamber 135 is connected with a supply channel connected to the output port 113 and a supply channel connected to the output port 114. The supply channel connected to the output port 113 is equipped with a protection valve 141, and a supply channel connected to the output port 114 is equipped with a protection valve 142. Also, the branch chamber 135 is connected with a pressure reducing valve 132, and a downstream of the pressure reducing valve 132 is branched into a supply channel connected to the output port 115 and a supply channel connected to the output port 116, which are equipped with protection valves 143 and 144, respectively. The respective protection valves 141 to 144 are arranged in parallel to a throttle and a check valve, and are closed when the circuits in which the compressed air flows are lost in the loads 51 to 54 connected to the output ports 113 to 116, respectively.

The protection valves 141 and 142 are opened when the compressed air circuits of the corresponding loads 51 and 52 are fully filled with the compressed air. Accordingly, the compressed air of the air tanks 51*a* and 52*a* for the main brake can pass through the pressure reducing valve 132 from the branch chamber 135, and be supplied to the output port 115 through the supply channel 136. For that reason, in a state where the air pressures in the air tanks 51*a* and 52*a* are sufficiently high, the parking brake can be released by supplying the compressed air to the load 53. On the other hand, when the air pressures in the air tanks 51*a* and 52*a* are insufficiently, the ECU 2 opens the electromagnetic valve 103. An instructed pressure of the electromagnetic valve 103 is given to the check valve 137, the supply channel 136 is closed by the check valve 137, and the supply channel of the compressed air to the output port 115 is interrupted. In this case, the parking brake cannot be released. However, when the air pressures in the air tanks 51*a* and 52*a*, which are used for the main brake are insufficient, it is preferable that the parking brake is not released. Also, when the air pressures in the air tanks 51*a* and 51*b* are recovered, the parking brake can be released. Accordingly, even if there is no air tank for the load 53, the parking brake can be stably operated by the compressed air.

Figure 12:
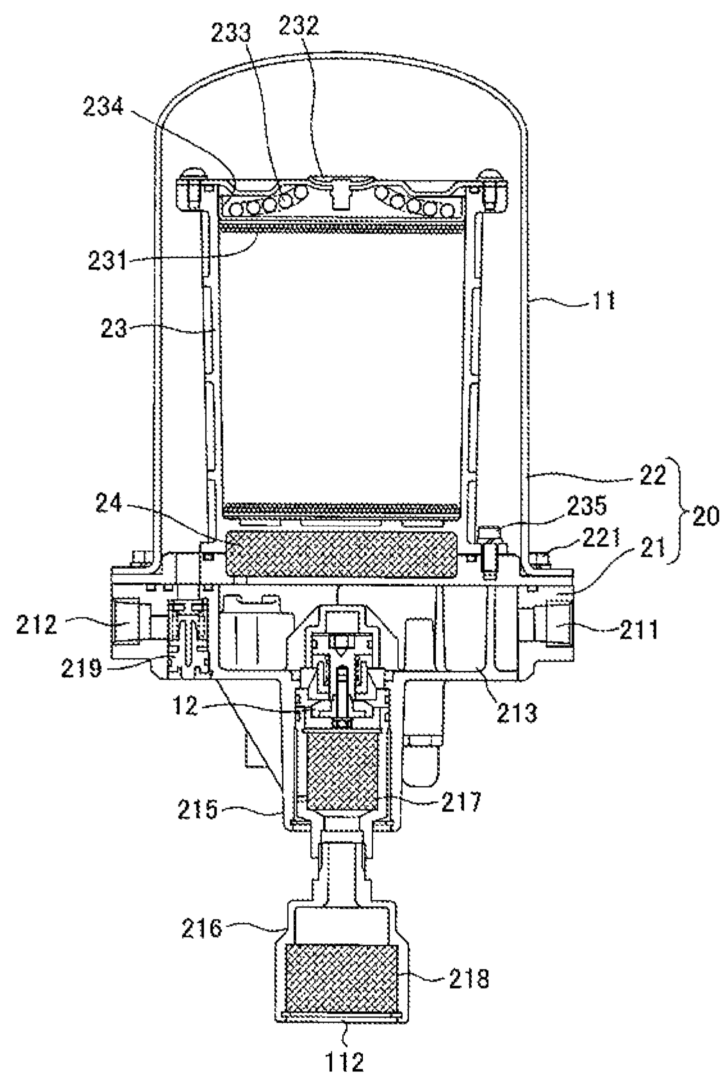
FIG. 12 is a cross-sectional view illustrating a configuration of an air dryer.

FIG. 12 is a cross-sectional view illustrating a specific configuration example of the air dryer 11. In FIG. 12, the respective parts identical with those in FIG. 7 are denoted by the same references, and their description will be omitted.

As illustrated in FIG. 12, the case 20 of the dryer 11 includes a dryer main body 21, and a cartridge cover 22 that covers the driver main body 21 and is fixed to the dryer main body 21 with bolts 221. The dryer main body 21 includes an inlet 211 which is connected to an inflow pipe 111 (FIG. 11), and into which the compressed air discharged from the discharge pipe 41 of the compressor 4 flows, and the supply channel 106 (FIG. 11) into which the compressed air is discharged from the case 20.

Incidentally, the drying agent 231 of the air dryer 11 is regenerated at the given interval (T0) as described above. The regeneration interval (T0) is every given time, or determined according to an accumulated ventilation volume of the drying agent 231, or the travel distance (travel time) of the vehicle. However, depending on the state of the drying agent 231, it is preferable to regenerate the drying agent 231 at an interval shorter than the given regeneration interval (T0), or it is preferable to regenerate the drying agent 231 at an interval longer than the given regeneration interval (T0). For example, when a dew-point temperature is higher such that the operation starts or the outside air temperature is low, it is preferable to conduct the regeneration at the interval shorter than the given regeneration interval (T0). On the other hand, when the dew-point temperature is low such as a winder season, the regeneration can be conducted at the interval longer than the given regeneration interval (T0). Also, the deterioration of the drying agent 231 is advanced with use, and the adsorption performance of the drying agent 231 is gradually deteriorated. When the adsorption performance of the drying agent 231 is low, it is preferable to gradually shorten the given regeneration interval (T0) according to the deterioration of the adsorption performance. In this way, in the regeneration condition of the drying agent 231, there is a need to first make the regeneration interval (regeneration frequency) of the drying agent 231 appropriate.

Also, when the drying agent 231 is regenerated, there is a need to make the amount of air (hereinafter referred to as "regeneration air amount") for ventilating the drying agent 231 during regeneration appropriate according to the state of the drying agent 231, that is, the amount of moisture adsorbed in the drying agent 231. Also, for example, when the compressed air accumulated in the air tank 51*a* is allowed to flow backward into the air dryer 11 to regenerate the drying agent 231, in order to efficiently regenerate the drying agent 231, there is a need to make appropriate a time (regeneration time) when the exhaust valve 12 (exhaust valve) is opened, and a pressure (regeneration pressure) within the air tank 51*a* according the volume of the air tank 51*a*, and the temperature and humidity of the compressed air within the air tank 51*a*. In this way, it is preferable to made appropriate the regeneration conditions such as the regeneration interval, the regeneration pressure, and the regeneration time of the drying agent 231, according to the water amount that is adsorbed by the drying agent 231, the degree of deterioration of the drying agent 231, and the pressure, humidity, and temperature of the compressed air for ventilating during regeneration. Under the circumstances, in the compressed air supply system 1 according to this preferred embodiment, a humidity detection sensor 314 is disposed within the air tank 51*a* that accumulates the compressed air to be supplied to the load 51, and the regeneration conditions of the drying agent 231 are made appropriate, that is, optimized on the basis of the detection results of the humidity detection sensor 314. In this preferred embodiment, the humidity level of the compressed air and the state of the drying agent 231 such as the amount of moisture adsorbed by the drying agent 231 are associated with each other on the basis of the data obtained through experiment in advance, and information indicative of this correspondence relationship is held in the ECU 2. Accordingly, the ECU 2 can detect the state of the drying agent 231 such as the amount of moisture adsorbed by the drying agent 231 on the basis of the humidity level of the compressed air within the air tank 51*a*, on the basis of the detection result of the humidity detection sensor 314. Also, when the adsorption performance of the drying agent 231 is deteriorated with the continuous use of the drying agent 231, the humidity level of the compressed air after the drying agent 231 has been regenerated is gradually increased. In this preferred embodiment, the degree of deterioration of the adsorption performance of the drying agent 231 and the degree of increase of the humidity level of the compressed air after the drying agent 231 has been regenerated are associated with each other on the basis of data obtained through experiment in advance, and information indicative of this correspondence relationship is held in the ECU 2. Accordingly, the ECU 2 can detect the degree of deterioration of the adsorption performance of the drying agent 231 on the basis of an increasing tendency of the humidity level after the drying agent 231 has been regenerated. Hereinafter, the amount of moisture adsorbed by the drying agent 231, and the degree of deterioration of the adsorption performance of the drying agent 231 are called "states of the drying agent 231".

Subsequently, a description will be given of the regenerating process of the drying agent 231 which is conducted under the control of the ECU 2. However, as illustrated in FIG. 11, the humidity detection sensor 314 is connected to the ECU 2. Also, a signal indicative of the detection result of the humidity detection sensor 314 is input to the ECU 2. In this example, the detection result of the humidity detection sensor 314 indicates a relative humidity within the air tank 51*a*, and also includes information related to the temperature.

First, the ECU 2 discriminates whether there comes a given regeneration timing, or not (Step S101). In this example, the given regeneration timing is a time point when the given regeneration interval (T0), or a regeneration interval (Tn) updated through the following processing has been elapsed since a time point when the regenerating process of the drying agent 231 has been previously conducted.

In Step S101, if it is discriminated that there comes the regeneration timing (Y in Step S101), the ECU 2 then discriminates whether the humidity level of the compressed air within the air tank 51*a* is a given threshold level or higher, or not, on the basis of the detection result of the humidity detection sensor 314 (Step S102). In this example, the threshold level is predetermined on the basis of the humidity level requiring the regeneration of the drying agent 231. Also, if it is discriminated that there does not come the regeneration timing in Step S101 (N in Step S101), the processing is shifted to Step S102, and it is discriminated whether the humidity level of the compressed air within the air tank 51*a* is the given threshold level or higher, or not.

Then, if it is discriminated that the humidity level of the compressed air within the air tank 51*a* does not arrive at the given threshold level (N in Step S102), the ECU 2 discriminates that the regeneration of the drying agent 231 is unnecessary, and returns to the discrimination in Step S101. That is, even though there comes the given regeneration timing, if the humidity level of the compressed air does not reach the given threshold level, the drying agent 231 is not regenerated.

On the other hand, in Step S102, if it is discriminated that the humidity level of the compressed air within the air tank 51*a* reaches the given threshold level in Step S102 (Y in Step S102), the ECU 2 then confirms the regeneration status of the drying agent 231 (Step S103). In Step S103, the ECU 2 confirms the state of the drying agent 231 on the basis of the accumulated ventilation volume of the drying agent 231, the number of regenerations, or the detection result of the humidity detection sensor 314 when the drying agent 231 has been regenerated in past. Then, in Step S104, the ECU 2 calculates an optimum regeneration air amount for regenerating the drying agent 231 on the basis of the state of the drying agent 231 which is confirmed in Step S103, the temperature and humidity level within the air tank 51*a*, which are obtained from the detection result of the humidity detection sensor 314, and the volume of the air tank 51*a* (Step S104).

Then, the ECU 2 acquires information related to the travel state of the vehicle (Step S105), and discriminates whether the drying agent 231 can be presently forcedly regenerated, or not (Step S106). In this example, the ECU 2 discriminates whether the vehicle is presently stopping, or not, and also discriminates whether the vehicle is during the brake assist operation, or not, on the basis of information related to the travel status of the vehicle which is acquired in Step S105, in the forced regeneration of the drying agent 231. Then, when the vehicle is not stopping, and not during the brake assist operation, the ECU 2 discriminates that the drying agent 231 can be forcedly regenerated (Y in Step S106). Then, the ECU 2 discriminates whether the pressure is high sufficient (optimum pressure) to regenerate the drying agent 231 with an appropriate regeneration time and efficiently, or not, on the basis of the optimum air amount calculated in Step S104 (Step S107). In this example, if it is discriminated that the pressure within the air tank 51*a* does not reach the optimum pressure (N in Step S107), the processing is returned to Step S105. However, if the pressure within the air tank 51*a* does not reach the optimum pressure in Step S107, although being not shown, the ECU 2 opens the electromagnetic valve 101 and the electromagnetic valve 102, and supplies the compressed air to the air tank 51*a* so as to put the compressor 4 into the load state.

On the other hand, in Step S107, if it is discriminated that the pressure within the air tank 51*a* is the optimum pressure (Y in Step S107), the ECU 2 opens the electromagnetic valve 101 and the electromagnetic valve 102 for a given regeneration time calculated on the basis of the optimum air amount calculated in Step S104, the pressure within the air tank 51*a*, and the volume of the air tank 51*a*, and regenerate the drying agent 231 (Step S108).

Then, after the drying agent 231 has been regenerated, the ECU 2 acquires the detection result of the humidity detection sensor 314 (Step S109). Then, the ECU 2 discriminates whether the humidity level of the compressed air within the air tank 51*a* is lowered to a given humidity normal level, or not, on the basis of the detection result of the humidity detection sensor 314, which is acquired in Step S109 (Step S110). In this example, the humidity normal level is set to a reference value for discriminating whether the adsorption performance required for the drying agent 231 is recovered by regeneration, or not.

If it is discriminated that the humidity level of the compressed air within the air tank 51*a* is lowered to the humidity normal level in Step S110 (Y in Step S110), it is then discriminated whether the humidity level after the regeneration has been conducted has an increasing tendency, or not (Step S111). In this example, the discrimination in Step S110 is conducted by comparison of the detection result of the humidity detection sensor 314, which is acquired in Step S109, with the detection result of the humidity detection sensor 314 after the drying agent 231 has been regenerated in past.

On the other hand, if it is discriminated that the humidity level of the compressed air within the air tank 51*a* is not lowered to the humidity normal level in Step S110 (N in Step S110), the regeneration interval (Tn) shorter than the given regeneration interval (Tn−1) by a given interval (a) is set as a new regeneration interval, and the processing is shifted to Step S101. The interval (a) is set on the basis of, for example, a time, the accumulated ventilation volume, and the travel distance suitable to shorten the regeneration interval (T0).

If it is also discriminated that the humidity level after the regeneration has been conducted has the increasing tendency in Step S111 (Y in Step S111), the processing is shifted to Step S112, and the given regeneration interval is shortened, and the regeneration frequency of the drying agent 231 is increased. In the above case, n is indicative of the number of times when the regeneration interval (T0) is updated, and n is an integer of 1 or more. After the regeneration interval has been updated in Step S112, the processing is returned to Step S101, and the above processing is repeated.

Also, if the humidity level of the compressed air within the air tank 51*a* after the regeneration has been conducted is lowered to the normal level (Y in Step S110), and the humidity level of the compressed air after the regeneration has been conducted has no increasing tendency (N in Step S111), the above processing is terminated. In this case, when the regeneration timing is updated, the processing may be terminated after the regeneration timing has been returned to an initial value (T0). Also, although being not shown, it is conceivable that the processing is returned to Step S101, the above processing is repeated, and the regenerating process of the drying agent 231 is conducted.

In this way, the compressed air supply device 1 includes the compressor 4 mounted in the vehicle, the air dryer module 10 that supplies the compressed air discharged from the compressor 4 to the load of the vehicle is connected to the compressor 4, the discharge line of the compressor 4 is provided with the air dryer 11 that removes a foreign material such as moisture included in the compressed air, and the humidity detection sensor 314 is disposed within the air tank 51*a* that accumulates the compressed air to be supplied to the load 51. The state of the drying agent 231 is detected on the basis of the detection result of the humidity detection sensor 14, and the regeneration condition is optimized according to the state of the drying agent 231.

Also, as shown in Steps S101 and S102, even though there comes the regeneration timing, if the humidity level of the compressed air within the air tank 51*a* on the basis of the detection result of the humidity detection sensor 314 does not satisfy the threshold level, since the drying agent 231 is not regenerated, the drying agent 231 can be prevented from being unnecessarily regenerated. Also, even before there comes the regeneration timing, if the detection result of the humidity detection sensor 314 is indicative of the threshold level or higher, since the drying agent 231 is regenerated, it can be accurately determined whether the drying agent 231 should be regenerated, or not, according to the state of the drying agent 231 or the state of the outside air. Also, since the optimum regeneration air amount is calculated according to the state of the drying agent 231 or the state of the outside air, the compressed air can be prevented from being exhausted to the outside air during the regeneration of the drying agent 231. Also, if the pressure within the air tank 51*a* does not reach the optimum pressure, since the drying agent 231 is regenerated after the pressure is increased, the drying agent 231 can be efficiently regenerated.

Also, in this way, the amount of moisture adsorbed by the drying agent 231, and the degree of deterioration of the adsorption performance of the drying agent 231 are detected with the use of the humidity detection sensor 314 to monitor the increasing tendency of the humidity level after the regeneration has been conducted. Therefore, it can be discriminated whether the humidity level of the compressed air is high because the regeneration is insufficient, or the drying agent 231 is deteriorated as much as the replacement is required. Thus, the deterioration of the drying agent 231 can be appropriately determined.

Also, the humidity level of the compressed air within the air tank 51*a* is hardly affected by an external factor, and stabilized. In the above fifth preferred embodiment, since the humidity detection sensor 14 is disposed within the air tank 51*a*, the humidity level of the compressed air after having passed the drying agent 231 can be detected with high precision. For that reason, according to the fifth preferred embodiment, the deterioration of the drying agent 231 can be determined with high precision on the basis of the detection result of the humidity detection sensor 314 after the drying agent 231 has been regenerated.

In the above fifth preferred embodiment, the humidity detection sensor 314 is disposed within the air tank 51*a*. However, the humidity detection sensor 314 may be disposed within the air tank 52*a*, or the humidity detection sensor 314 may be disposed in each of the air tank 51*a* and the air tank 52*a*. The air tank 51*a* and the air tank 52*a* that supply the compressed air to the above load, particularly, the brake, are provided in any vehicle. Therefore, with the provision of the humidity detection sensor 314 within the air tanks 51*a* and 52*a*, the present invention can be easily applied to any compressed air supply systems mounted in the vehicles.

Also, in the above description, when the drying agent 231 is regenerated, the compressed air accumulated in the air tank 51*a* is used. However, the compressed air accumulated in the air tank 52*a* may be used, or the compressed air accumulated in both of the air tanks 51*a* and 52*a* may be used, without any limitation.

Sixth Preferred Embodiment

Figure 14:
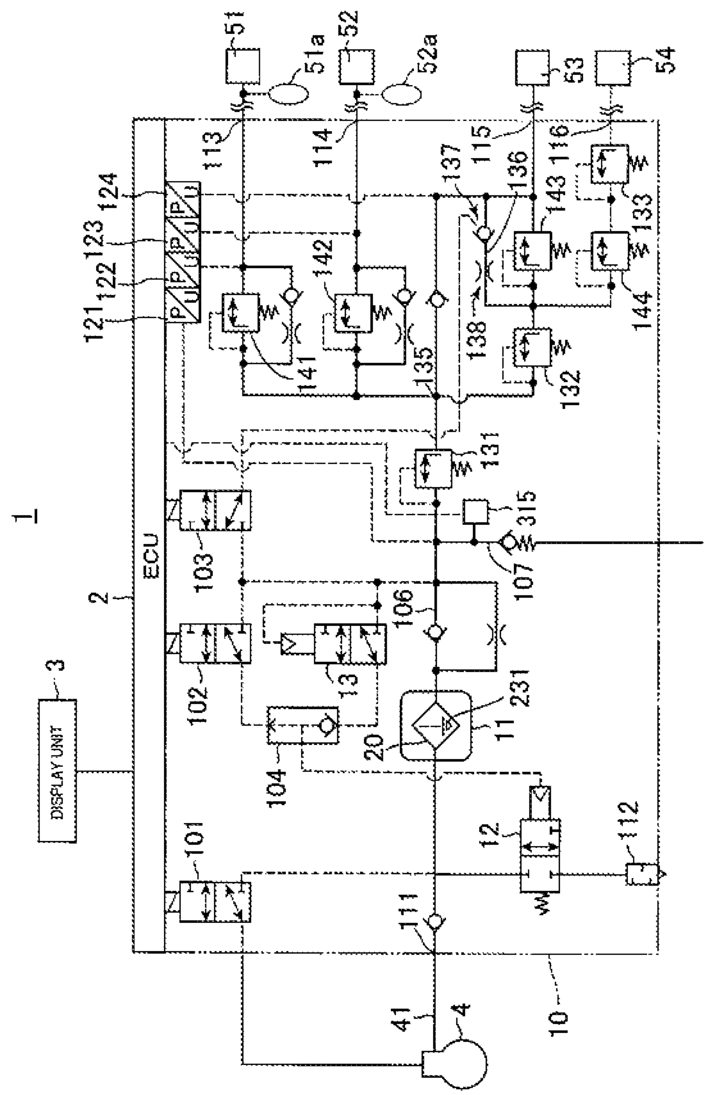
FIG. 14 is a diagram illustrating a configuration of a compressed air supply system according to a sixth preferred embodiment of the present invention.

FIG. 14 is a diagram illustrating a configuration of a compressed air supply system 200 according to a sixth preferred embodiment. In the sixth preferred embodiment, the respective parts identical with those in the fifth preferred embodiment are denoted by the same references, and their description will be omitted. In the fifth preferred embodiment, the humidity detection sensor 314 is disposed within the air tank 51*a* that accumulates the compressed air to be supplied to the load 51. In the second preferred embodiment, a humidity detection sensor 315 is disposed in a branch pipe 107 branched from the supply channel 106.

Figure 13:
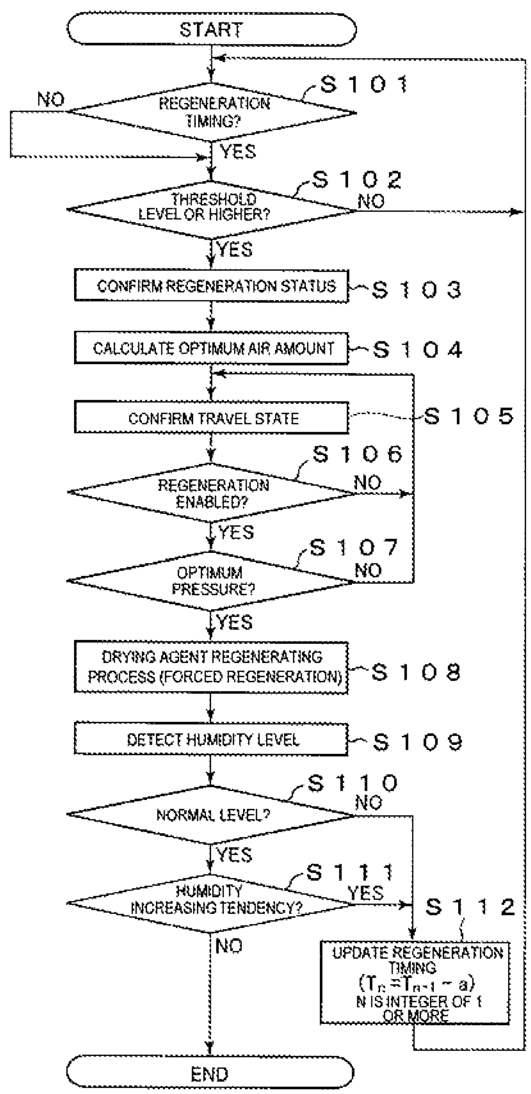
FIG. 13 is a flowchart illustrating a regenerating process for a drying agent.

In the sixth preferred embodiment, except that the humidity level and the temperature of the compressed air within the air dryer module 10 are detected by the humidity detection sensor 315, substantially as in the flowchart illustrated in FIG. 13, the regenerating process of the drying agent 231 can be conducted with the use of the detection result of the humidity detection sensor 315. In this way, the state of the drying agent 231 such as the amount of moisture adsorbed by the drying agent 231 or the deterioration of the drying agent 231 is detected on the basis of the detection result of the humidity detection sensor 315, and the regeneration condition such as the regeneration interval, the regeneration pressure, or the regeneration time of the drying agent 231 can be made appropriate according to the state of the drying agent 231.

The above-described fifth and sixth preferred embodiments show modes for carrying out the present invention, and the present invention is not limited to those preferred embodiments. For example, in the above preferred embodiments, the humidity detection sensor 314 or 315 is disposed within the air tank 51*a* or in the branch pipe 107 branched from the supply channel 106. However, a position at which the humidity detection sensor is disposed is not limited to those arrangements. For example, the humidity detection sensor may be disposed downstream of the drying agent 231 within the air dryer 11. The arrangement of the humidity detection sensor is not particularly limited if the humidity detection sensor is disposed downstream of the drying agent 231 and at a position where the humidity of the compressed air after having passed through the drying agent 231 can be detected.

Seventh Preferred Embodiment

Figure 15:
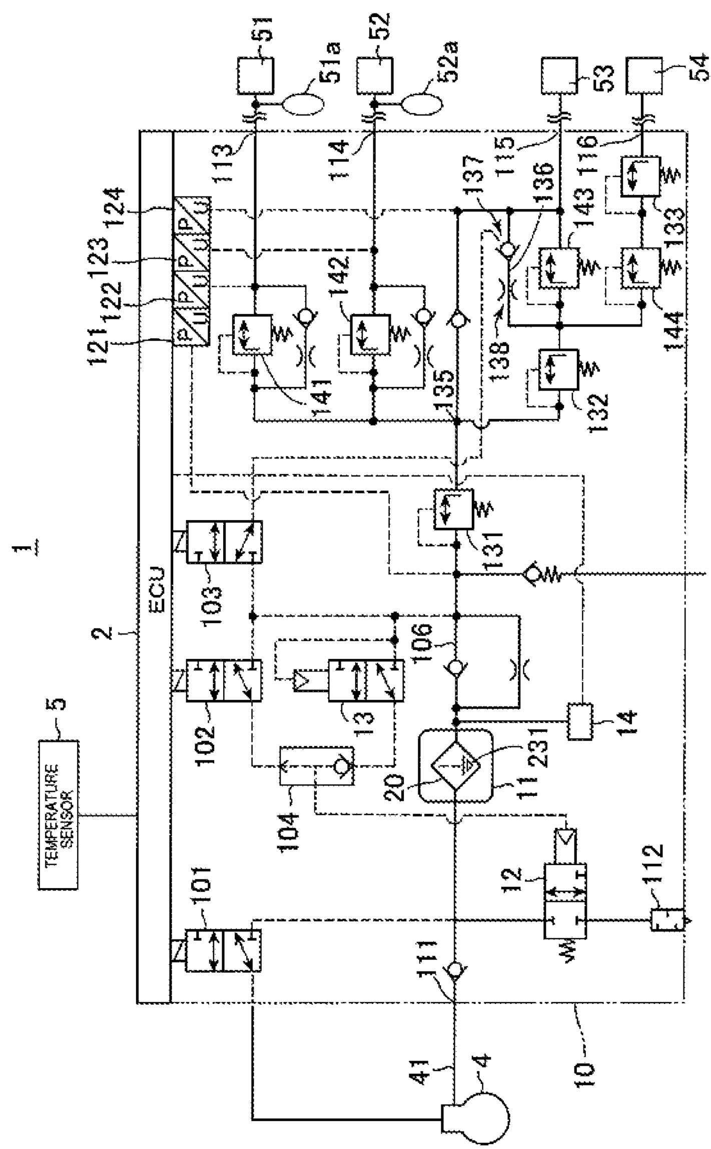
FIG. 15 is a diagram illustrating a configuration of a compressed air supply system according to a preferred embodiment of the present invention.

FIG. 15 is a diagram illustrating a configuration of a compressed air supply system 1 according to a seventh preferred embodiment of the present invention.

In the seventh preferred embodiment, the respective parts identical with those in the first embodiment are denoted by the same references, and their description will be omitted.

The ECU 2 controls the operation of the engine in the vehicle, and also controls the operation of the compressor 4 and the air dryer module 10, on the basis of the vehicle speed of the vehicle in which the compressed air supply system 1 is mounted. Also, the ECU 2 is connected with a temperature sensor 5, and receives information representative of a temperature detected by the temperature sensor 5. The temperature sensor 5 is a temperature sensor arranged in a portion that contacts the outside air of the vehicle. Specifically, the temperature sensor 5 is configured by a thermistor or a thermocouple, and outputs a voltage value corresponding to the outside air temperature from the ECU 2.

The temperature sensor 5 is, for example, connected to an ECU that controls the engine in the vehicle, and under the control of this ECU, the outside air temperature detected by the aid of the temperature sensor 5 is displayed on a speed meter unit (not shown).

When the exhaust valve 12 is opened in a state where the air pressure within the air dryer module 10 is sufficiently high, the compressed air accumulated downstream of the air dryer 11 (for example, within the supply channel 106 or the air tanks 51*a* and 52*a*) flows backward within the case 20 of the air dryer 11, and is discharged from the exhaust port 112. In this situation, air passing through the case 20 becomes super-dried by a rapid pressure reduction, and the moisture is taken from the drying agent 231 in the case 20. Therefore, the drying agent 231 is regenerated. The regenerated drying agent 231 recovers the adsorption performance for adsorbing moisture so as to remove the moisture in the compressed air. The regenerating operation is executed by opening the electromagnetic valve 101 and the electromagnetic valve 102 by the ECU 2. For example, the ECU 2 conducts the regenerating operation every given time, or estimates the state of the drying agent 231 according to the ventilation volume in the air dryer 11 to conduct the regenerating operation on the basis of this estimation.

As illustrated in FIG. 12, the case 20 of the dryer 11 includes a dryer main body 21, and a cartridge cover 22 that covers the driver main body 21 and is fixed to the dryer main body 21 with bolts 221. The dryer main body 21 includes an inlet 211 which is connected to an inflow pipe 111 (FIG. 15), and into which the compressed air discharged from the discharge pipe 41 of the compressor 4 flows, and the supply channel 106 (FIG. 15) into which the compressed air is discharged from the case 20.

In the air dryer module 10, a dew condensation water generated by dew condensation may be accumulated in the case 20. When the vehicle stops (parks) for a long time during the cold months, there is a possibility that water accumulated in the case 20 is frozen, resulting in a risk that the respective parts are damaged by freezing. For that reason, up to now, when the vehicle stops, the exhaust valve 12 is opened to exhaust the moisture within the case 20 together with the compressed air to the external.

In the air dryer module 10 according to the seventh preferred embodiment, the outside air temperature of the vehicle is detected by the temperature sensor 5 connected to the ECU 2, and if the outside air temperature falls below a given temperature, the electromagnetic valve 101 is opened under the control of the ECU 2 for a given time to conduct the exhausting operation of exhausting the moisture together with the compressed air to the outside of the case 20.

Figure 16:
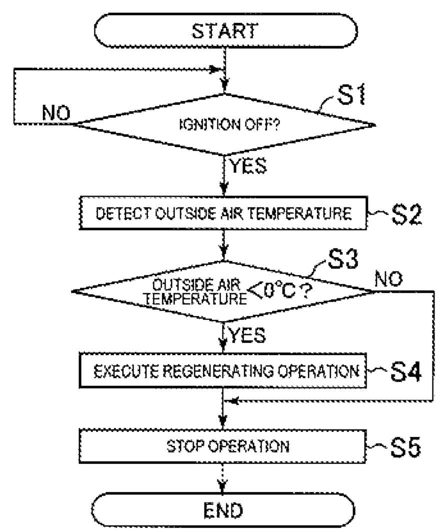
FIG. 16 is a flowchart illustrating the operation of an air dryer module.

FIG. 16 is a flowchart illustrating the operation of the air dryer module 10 including the exhausting operation.

When the ECU 2 detects that an ignition switch of the vehicle turns off (yes in Step S1), the ECU 2 acquires an output voltage of the temperature sensor 5 to detect the outside air temperature (Step S2). Subsequently, the ECU 2 discriminates whether the detected outside air temperature is lower than 0° C. Celsius, or not (Step S3). If the outside air temperature is lower than 0° C. (Yes in Step S3), the ECU 2 conducts the regenerating operation of opening the electromagnetic valve 101 for a given time (Step S4), and exhausts the moisture accumulated within the case 20 together with the compressed air from the exhaust valve 12 by the regenerating operation. Thereafter, the ECU 2 puts the respective parts of the compressed air supply system 1 into a stop state, and also stops its own operation (Step S5). On the other hand, if the outside air temperature detected by the temperature sensor 5 is 0° C. Celsius or higher (No in Step S3), the operation stops in Step S5 as it is.

In this way, the compressed air supply device 1 includes the compressor 4 mounted in the vehicle, and the air dryer module 10 that supplies the compressed air discharged from the compressor 4 to the load of the vehicle is provided to a discharge line of the compressor 4. The compressed air supply system 1 also includes the air dryer 11 that removes a foreign material such as moisture included in the compressed air, and the exhaust valve 12 that exhausts the moisture accumulated within the air dryer 11 together with the compressed air. The temperature is detected by the ECU 2, and if the detected temperature falls below a given temperature, the ECU 2 opens the exhaust valve 12, and exhausts the moisture accumulated in the air dryer 11 to the external.

For that reason, when there is a possibility that the moisture within the air dryer 11 is frozen, the moisture accumulated in the air dryer 11 is exhausted to the external together with the compressed air. Therefore, the consumption of the compressed air, which is caused by exhaust of the moisture, can be suppressed while the freezing in the air dryer is surely prevented.

Also, when the ignition of the vehicle turns off, and the vehicle stops the operation, the exhaust valve 12 is opened to exhaust the moisture accumulated within the air dryer 11 to the external. Therefore, the exhausting operation is not conducted during traveling or during the operation of the vehicle where the moisture is hardly frozen. Further, the drying agent 231 is regenerated under the control of the ECU 2 during the operation of the vehicle, and the moisture within the case 20 is exhausted together with the compressed air during the regenerating operation. Therefore, unless the exhaust valve 12 is opened for the purpose of exhausting the moisture during the operation, the moisture can be removed. For that reason, since the number of executing the operation for exhausting the moisture together with the compressed air can be minimized, the consumption of the compressed air, which is caused by exhaust of the moisture, can be suppressed.

In particular, when the compressed air within the air dryer module 10 is consumed when the vehicle stops, the compressed air accumulated in the air dryer module 10 during parking is reduced. For that reason, the consumption of the compressed air before parking is minimized, resulting in such an advantage that a sufficient compressed air can be frequently used when the vehicle starts.

Further, the ECU 2 is connected with the temperature sensor 5 mounted in the vehicle. If an outside air temperature detected by the temperature sensor 5 falls below a given temperature, the exhaust valve 12 is opened to exhaust the moisture accumulated in the air dryer 11 to the external. Therefore, it is discriminated whether there is a possibility of freezing, or not, on the basis of the outside air temperature, and only when there is a risk of freezing, the moisture is exhausted together with the compressed air. Therefore, the consumption of the compressed air, which is caused by exhaust of the moisture, can be suppressed.

Also, in the operation illustrated in FIG. 16, if the outside air temperature when an ignition switch of the vehicle turns off is 0° C. or higher (No in Step S3), after the ECU 2 stops in Step S5, the ECU 2 may periodically monitor the outside air temperature, and exhaust the moisture accumulated in the air dryer 11 to the external when the outside air temperature becomes lower than 0° C.

More specifically, if the outside air temperature is 0° C. or higher in Step S3, and the ECU 2 stops in Step S5, the ECU 2 and the temperature sensor 5 may be energized every given time. The ECU 2 may start, and discriminate whether the outside air temperature is lower than 0° C., or not, on the basis of the output voltage of the temperature sensor 5. If the outside air temperature is 0° C. or higher, the ECU 2 may again stop, and if the outside air temperature is lower than 0° C., the ECU 2 may start the respective parts of the compressed air supply system 1 to open the electromagnetic valve 101 by the same operation as that in Step S4 for a given time, and may stop the respective parts including the ECU 2 after exhausting the moisture accumulated within the case 20 from the exhaust valve 12. In other words, after the ECU 2 has stopped in Step S5, the ECU 2 may start every given time to conduct the operation of Steps S2 to S5 in FIG. 16 while the vehicle is stopping. In this case, at a time point when the ignition switch turns off, the outside air temperature is 0° C. or higher. Thereafter, if the outside air temperature is lowered, and becomes lower than 0° C., the moisture accumulated in the air dryer 11 can be prevented from being frozen.

After the electromagnetic valve 101 has been opened through the operation of FIG. 16 even once since the ignition switch of the vehicle has turned off, the moisture accumulated in the air dryer 11 has been already exhausted. Therefore, further exhaust is not required. For that reason, after the electromagnetic valve 101 has been opened through the operation of FIG. 16, the periodic energization to the ECU 2 may not be allowed until the ignition of the vehicle again turns on.

In the above seventh preferred embodiment, the temperature sensor 5 arranged at a position that contacts the outside air of the vehicle is connected to the ECU 2, and the ECU 2 detects the outside air temperature by the aid of the temperature sensor 5. However, the present invention is not limited to this configuration, but the temperature sensor 5 may be connected to an ECU that controls the engine in the vehicle, and information representative of the outside air temperature detected by the aid of the temperature sensor 5 may be input to the ECU 2 from the ECU.

Also, in the seventh preferred embodiment, if the temperature detected by the aid of the temperature sensor 5 falls below the given temperature (0° C.), the regenerating operation is conducted under the control of the ECU 2 to exhaust the moisture. However, the present invention is not limited to this configuration. For example, the temperature detection conducted every given time is executed in plurality, and an average value or an integrated value of a plurality of detection temperatures, or a change ratio of the temperature change is obtained, and when the obtained value meets a given condition, the regenerating operation may be conducted.

Also, the temperature sensor 5 may be replaced with a temperature sensor disposed in the air dryer module 10 to detect the temperature, and the regenerating operation may be conducted on the basis of whether the detected temperature falls below a given temperature, or not. In this case, the temperature sensor may detect a temperature of the compressed air in a flow channel in which the compressed air flows in the air dryer module 10. In this case, the location may be provided in the supply channel 106 downstream or upstream of the air dryer 11, or may be provided in the air dryer 11 per se. Also, with the provision of a branch pipe branched from the existing pipe, the temperature sensor may be disposed in the branch pipe. Also, a temperature sensor that detects the outside air temperature of the air dryer module 10 may be provided, and its location may be, for example, in a pipe configuring the air dryer module 10 or on an outer surface of the air dryer 11, but is not particularly limited.

Furthermore, when a humidity sensor that detects the humidity of the compressed air is disposed downstream of the air dryer 11 for the purpose of discriminating the state of the drying agent 231, the temperature detected by the humidity sensor may be acquired by the ECU 2, and the regenerating operation may be conducted on the basis of the temperature. In this case, the humidity sensor for detecting the state of the drying agent 231 is effectively employed so that the dew condensation water can be prevented from being frozen.

Also, the load connected to the air dryer module 10 is not limited to the main brake device, the parking brake, and the accessory type, but any device may be connected to the air dryer module 10 when the device uses the compressed air, and other detailed configurations can be also arbitrarily changed. Also, the vehicle that is a target of the compressed air supply device for a vehicle according to the present invention is not particularly limited, but may be any one of a heavy vehicle, a small vehicle, a specialized vehicle, a tow vehicle, a two-wheel vehicle, and a three-wheel vehicle, and its scale and form are arbitrary.

Eighth Preferred Embodiment

In FIG. 11, when the exhaust valve 12 is opened in a state where the air pressure within the air dryer module 10 is sufficiently high, the compressed air accumulated downstream of the air dryer 11 flows backward within the case 20 of the air dryer 11, and is discharged from the exhaust port 112. In this situation, air passing through the case 20 becomes super-dried by a rapid pressure reduction, and the moisture is taken from the drying agent 231 in the case 20. Therefore, the drying agent 231 is regenerated. The regenerated drying agent 231 recovers the adsorption performance for adsorbing moisture so as to remove the moisture in the compressed air. The regenerating operation is executed by opening the electromagnetic valve 102 by the ECU 2 every given time, or in given regeneration timing (given timing) such that the air pressure within the air dryer module 10 meets a given condition.

Incidentally, the drying agent 231 of the air dryer 11 is deteriorated with use, and the adsorption performance after regeneration has been conducted is gradually deteriorated. One of causes for the deterioration of the drying agent 231 resides in that the compressor oil that flows from the discharge pipe 41 of the compressor 4 into the air dryer 11 is adhered to the surface of the drying agent 231. The drying agent 231 is made of porous material such as silica gel. When oil is adhered to the surface of the drying agent 231, countless holes in the surface of the drying agent 231 are filled with the oil, and the amount of adsorption of moisture is deteriorated. In this case, even if the drying agent 231 is regenerated, the adsorption performance required for the drying agent 231 cannot be recovered, and the drying agent 231 needs to be replaced with fresh one. However, from the viewpoints of the costs and man-hour, it is desirable to minimize the replacement frequency with determination of appropriate replacement timing. Under the circumstances, in the compressed air supply system 1 according to this preferred embodiment, the humidity detection sensor 314 is disposed within the air tank 51*a* that accumulates the compressed air to be supplied to the load 51, and the humidity of the compressed air after the drying agent 231 has been regenerated by the humidity detection sensor 314 is detected, and on the basis of this detection result, the replacement timing of the drying agent 231 can be determined.

The humidity detection sensor 314 is connected to the ECU 2, and a signal indicative of the detection result of the humidity detection sensor 314 is input to the ECU 2. The ECU 2 acquires information related to the humidity level of the compressed air within the air tank 51*a*. In this example, the detection result of the humidity detection sensor 314 indicates a relative humidity within the air tank 51*a*, and also includes information related to the temperature. The ECU 2 is equipped with a display unit 3 (output unit) that displays the detection result of the humidity detection sensor 314. The ECU 2 acquires the detection result on the basis of the input signal. As specific configurations of the display unit 3, there are an LED that switches lighting, extinction, and blinking according to the detection result, and a liquid display panel that displays the detection result by characters and signs. The display unit 3 may be implemented together with a speed meter of the vehicle, or may be disposed in the vicinity of the compressor 4 or the dryer 11 in the vehicle. The display unit 3 enables a driver, a mechanic that overhauls the vehicle, or a manger who manages the vehicle to view the detection result of the humidity detection sensor 314, and to appropriately determine the replacement time of the drying agent 231. As described below, the deterioration of the drying agent 231 can be determined on the basis of the detection result of the humidity detection sensor 314.

In this example, the deterioration of the drying agent 231 means a state in which even if the drying agent 231 is regenerated, the adsorption performance required for the drying agent 231 cannot be recovered up to a desired level in the compressed air supply system 1.

Subsequently, a description will be given of the deterioration determining process of the drying agent 231 by the ECU 2 with reference to FIG. 17.

First, the ECU 2 determines whether there comes a given regeneration timing, or not (Step S201). When there does not presently come the given regeneration timing (N in Step S201), the ECU 2 then discriminates whether the humidity level of the compressed air within the air tank 51*a* is a given threshold level or higher, or not, on the basis of the detection result of the humidity detection sensor 314 (Step S202). In this example, the threshold level is set in advance on the basis of the humidity level requiring the regeneration of the drying agent 231.

If it is discriminated that the humidity level of the compressed air does not arrive at the given threshold level (N in Step S202), the processing returns to the discrimination in Step S201. If it is discriminated that the humidity level of the compressed air is the given level or higher (N in Step S202), the ECU 2 then confirms the regeneration status of the drying agent 231 (Step S203). In Step S203, for example, the ECU 2 confirms the state of the accumulated ventilation volume of the air dryer 11. Then, the ECU 2 confirms the travel state of the vehicle (Step S204), and discriminates whether the drying agent 231 can be presently regenerated, or not, on the basis of the travel state of the vehicle (Step S205). In this example, in more detail, the ECU 2 discriminates whether the drying agent 231 can be regenerated, or not, on the basis of whether the vehicle is presently stopping, or not, whether pressures within the air tanks 51*a* and 51*b* are sufficient to regenerate the given drying agent 231, or not, or whether the vehicle is during the brake assist operation, or not. In this example, when the vehicle is not stopping, the pressures within the air tanks 51*a* and 51*b* are sufficient to regenerate the given drying agent 231, and the vehicle is not during the brake assist operation, it is discriminated that the drying agent 231 can be regenerated (Y in Step S205). In any one of the case where the vehicle is traveling, the case where the pressures within the air tanks 51*a* and 52*a* are not sufficient to regenerate the given drying agent 231, and the case where the vehicle is during the brake assist operation, it is discriminated that the drying agent 231 cannot be regenerated.

If it is discriminated that the drying agent 231 can be presently regenerated in Step S205 (Y in Step S205), the ECU 2 opens the electromagnetic valve 101 and the electromagnetic valve 102, and regenerates the drying agent 231 regardless of a given regeneration timing (Step S206). If it is discriminated that there comes the given regeneration timing in Step S201 (Y in Step S201), the travel state is also confirmed (Step S204), and if the regeneration is enabled (Y in Step S205), the process of regenerating the drying agent 231 is conducted (Step S206).

Then, in Step S206, after the drying agent 231 has been regenerated, the ECU 2 discriminates whether the drying agent 231 is deteriorated, or not, on the basis of the detection result of the humidity detection sensor 314 (Step S207). More specifically, the ECU 2 discriminates whether the drying agent 231 is deteriorated, or not, on the basis of whether the humidity level of the compressed air within the air tank 51*a* is lowered down to a given humidity normal level, or not (Step S207). The humidity normal level is set to a reference value for discriminating whether the adsorption performance required for the drying agent 231 is recovered by regeneration, or not.

If it is discriminated that the humidity level of the compressed air is lowered down to the given humidity normal level in Step S207 (Y in Step S207), it can be determined that the adsorption performance of the drying agent 231 is recovered by the regeneration. For that reason, the ECU 2 determines that the drying agent 231 is not deteriorated, outputs the determination result indicating that the drying agent 231 is not deteriorated to the display unit 3, and allows the display unit 3 to display that the drying agent 231 is not deteriorated (Step S208).

On the other hand, if the humidity level of the compressed air is not lowered down to the given humidity normal level in Step S207 (N in Step S207), because the adsorption performance required for the drying agent 231 is not recovered even if the regeneration is conducted, there is a high possibility that the drying agent 231 is deteriorated. For that reason, the ECU 2 determines that the drying agent 231 is deteriorated, and outputs the determination result indicating that the drying agent 231 is deteriorated to the display unit 3 to allow the display unit 3 to display that the drying agent 231 is deteriorated (Step S209). In this way, in Step S207, the ECU 2 functions as a deterioration determination unit that determines the deterioration of the drying agent 231.

If it is discriminated that the humidity level of the compressed air is not lowered down to the given humidity normal level in Step S207 (N in Step S207), it may be determined whether there comes the replacement timing of the drying agent 231, or not, on the basis of the detection result of the humidity detection sensor 314, the information related to the travel status of the vehicle, and/or the information related to the operating status of the air dryer 11. In this example, as the information related to the travel status of the vehicle, there is, for example, the information related to the travel time of the vehicle. Also, as the information related to the operating status of the air dryer 11, there is, for example, the information related to the accumulated ventilation volume of the air dryer 11. The accumulated ventilation volume is obtained by the ventilation volume (volume), the ventilation pressure, and the ventilation time of the compressed air that has passed through the air dryer 11.

Although there comes the given regeneration timing, when the humidity level of the compressed air within the air tank 51*a* does not arrive at the humidity normal level even after the regeneration has been conducted, the travel time of the vehicle exceeds the humidity level, or the accumulated ventilation volume of the air dryer 11 exceeds the given volume, the drying agent 231 cannot recover the adsorption performance of the drying agent 231 by the regeneration, and it can be determined that the drying agent 231 is deteriorated as much as the drying agent 231 should be replaced with fresh one. Then, the ECU 2 may output the determination result to the display unit 3, and inform the driver or the mechanic of the vehicle that there comes the replacement timing of the drying agent 231.

Also, although the travel time of the vehicle does not exceed the given time, if the humidity level of the compressed air within the air tank 51*a* does not arrive at the humidity normal level even after the drying agent 231 has been regenerated, the drying agent 231 is regenerated again (or plural times), and it may be discriminated whether the regeneration of the drying agent 231 is insufficient, or not, and whether the degree of deterioration of the drying agent 231 reaches the degree required for replacing the drying agent 231, or not, on the basis of a change in the humidity level of the compressed air within the air tank 51*a*. Likewise, although the accumulated ventilation volume of the air dryer 11 does not exceed the given volume, if the humidity level of the compressed air within the air tank 51*a* does not arrive at the humidity normal level even after the drying agent 231 has been regenerated, the drying agent 231 is regenerated again (or plural times), and it may be discriminated whether the regeneration of the drying agent 231 is insufficient, or not, and whether the degree of deterioration of the drying agent 231 reaches the degree required for replacing the drying agent 231, or not, on the basis of the change in the humidity level of the compressed air within the air tank 51*a*.

Also, in the above description, if there comes the given regeneration timing in Step S201 (Y in Step S201), the processing is shifted to Step S204. However, the processing may be shifted to the discrimination in Step S202. Even though there comes the given regeneration timing, if the humidity level of the compressed air does not arrive at the threshold level, it is discriminated that there is no need to regenerate the drying agent 231, and the number of regenerations may be made appropriate.

Figure 17:
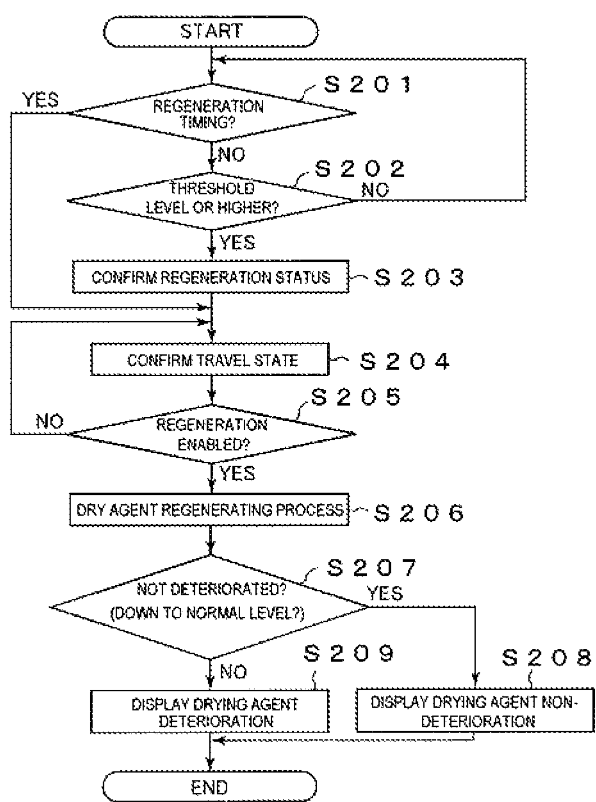
FIG. 17 is a flowchart illustrating a deterioration determining process.

Also, in FIG. 17, although being not shown, if the pressures within the air tanks 51*a* and 52*a* are not sufficient to regenerate the given drying agent 231, it is preferable that the ECU 2 opens the electromagnetic valve 101 and the electromagnetic valve 102 so as to put the compressor 4 into the load state so that the air pressures within the air tanks 51*a* and 52*a* are sufficiently increased.

According to the eighth preferred embodiment described above, the compressed air supply device 1 includes the compressor 4 mounted in the vehicle, the air dryer module 10 that supplies the compressed air discharged from the compressor 4 to the load of the vehicle is connected to the compressor 4, the discharge line of the compressor 4 is provided with the air dryer 11 that removes a foreign material such as moisture included in the compressed air, and the humidity detection sensor 314 is disposed within the air tank 51*a* that accumulates the compressed air to be supplied to the load 51. The deterioration of the drying agent 231 is determined on the basis of the detection result of the humidity detection sensor 314 after the drying agent 231 has been regenerated, and the display unit 3 that outputs the detection result is provided. Therefore, with the output of the detection result, the driver or the mechanic of the vehicle can accurately know the degree of deterioration of the drying agent 231, and can appropriately determine whether the drying agent 231 should be replaced with fresh one, or not.

Also, in the above preferred embodiment, if the humidity level detected by the humidity detection sensor 314 is the threshold level or higher, the drying agent 231 is regenerated regardless of the given regeneration timing, and the deterioration of the drying agent 231 is determined on the basis of the detection result of the humidity detection sensor 314 after the drying agent 231 has been regenerated. For that reason, if the humidity level of the compressed air is high because the regeneration of the drying agent 231 is insufficient, the determination that the drying agent 231 is deteriorated can be prevented.

Also, the humidity level of the compressed air within the air tank 51*a* is hardly affected by an external factor, and stabilized. In the above eighth preferred embodiment, since the humidity detection sensor 14 is disposed within the air tank 51*a*, the humidity level of the compressed air after having passed the drying agent 231 can be detected with high precision. For that reason, according to the eighth preferred embodiment, the deterioration of the drying agent 231 can be determined with high precision on the basis of the detection result of the humidity detection sensor 314 after the drying agent 231 has been regenerated.

Also, it is determined whether there comes the replacement timing of the drying agent 231, or not, with the use of the information related to the travel status of the vehicle, and the information related to the operating status of the air dryer 11 together with the detection result of the humidity detection sensor 314 after the drying agent 231 has been regenerated. As a result, the state of deterioration of the drying agent 231, and the necessity of replacement of the drying agent 231 can be more accurately determined.

In the eighth preferred embodiment, the humidity detection sensor 314 is disposed within the air tank 51*a*. However, the humidity detection sensor 314 may be disposed within the air tank 52*a*, or the humidity detection sensor 314 may be disposed in each of the air tank 51*a* and the air tank 52*a*. Because the air tanks 51*a* and 52*a* that supply the compressed air to the above loads, particularly, the brake, are provided in any type of vehicles, the present invention can be easily applied to any compressed air supply system for a vehicle with the provision of the humidity detection sensor 314 within the air tanks 51*a* and 52*a*.

Ninth Preferred Embodiment

In the eighth preferred embodiment, the humidity detection sensor 314 is disposed within the air tank 51*a* that accumulates the compressed air to be supplied to the load 51. In a ninth preferred embodiment, in FIG. 14, the humidity detection sensor 315 is disposed in the branch pipe 107 branched from the supply channel 106.

In the ninth preferred embodiment, substantially as in a flowchart illustrated in FIG. 17, the deterioration determining process of the drying agent 231 can be conducted with the use of the detection result of the humidity detection sensor 16.

According to the ninth preferred embodiment, the humidity detection sensor 315 is disposed downstream of the drying agent 231, the deterioration of the drying agent 231 is determined on the basis of the detection result of the humidity detection sensor 315 after the drying agent 231 has been regenerated, and the display unit 3 that output the determination result is provided. Therefore, with the output of the detection result, as in the eighth preferred embodiment, the driver or the mechanic of the vehicle can accurately know the degree of deterioration of the drying agent 231, and can appropriately determine whether the drying agent 231 should be replaced with fresh one, or not.

The above-described eighth and ninth preferred embodiments show modes for carrying out the present invention, and the present invention is not limited to those preferred embodiments. For example, in the above preferred embodiments, the humidity detection sensor 314 or 315 is disposed within the air tank 51*a* or in the branch pipe 107 branched from the supply channel 106. However, a position at which the humidity detection sensor is disposed is not limited to those arrangements. For example, the humidity detection sensor may be disposed downstream of the drying agent 231 within the air dryer 11. The arrangement of the humidity detection sensor is not particularly limited if the humidity detection sensor is disposed downstream of the drying agent 231 and at a position where the humidity of the compressed air after having passed through the drying agent 231 can be detected.

In the above preferred embodiments, the display unit 3 that output the detection results of the humidity detection sensors 314 and 315 is provided. However, the output mode can be arbitrarily changed. For example, the detection results of the humidity detection sensors 314 and 315 may be output by voice or the operation or position of a structure. A signal indicative of the detection result of the humidity detection sensors 314 and 315 may be output from the ECU 2 to an external device in a wired or wireless manner. When a printer is connected to the ECU 2, the detection results of the humidity detection sensors 314 and 315 may be printed under the control of the ECU 2. Further, in the above preferred embodiments, the deterioration of the drying agent 231 and the necessity of the replacement are determined by the ECU 2. When the detection results of the humidity detection sensors 314 and 315 are higher than the normal level merely by comparison with the normal level, the detection result may be displayed.

Tenth Preferred Embodiment

Hereinafter, a description will be given of a tenth preferred embodiment of the present invention with reference to the drawings.

FIG. 15 is a diagram illustrating a configuration of a compressed air supply system 1 according to a tenth preferred embodiment of the present invention. In the tenth preferred embodiment, the respective parts identical with those in the first preferred embodiment are denoted by the same references.

The compressed air supply system 1 (compressed air supply system for a vehicle) illustrated in FIG. 15 is, for example, a device that supplies a compressed air for driving to an air brake device mounted in a heavy vehicle such as a truck or a bus. The compressed air supply system 1 includes a compressor 4 (air compressor), an ECU 2 that controls the compressor 4, and an air dryer module 10 that removes moisture in a compressed air discharged from the compressor 4, and supplies the dried compressed air to a load (for example, brake device) of the vehicle.

The ECU 2 controls an engine of the vehicle and also controls the operation of the compressor 4 and the air dryer module 10, on the basis of the speed of the vehicle in which the compressed air supply system 1 is mounted. Also, the ECU 2 is connected with the temperature sensor (outside air temperature detection sensor) 5, and receives information indicative of a temperature detected by the temperature sensor 5. The temperature sensor 5 is a temperature sensor arranged in a portion that contacts the outside air of the vehicle, for example, between the mechanisms outside the vehicle. Specifically, the temperature sensor 5 is configured by a thermistor or a thermocouple, and outputs a voltage value corresponding to the outside air temperature from the ECU 2. Also, the ECU 2 receives information related to the travel statuses of the vehicle such as information related to the vehicle speed of the vehicle or information related to the travel distance of the vehicle, and information related to the operating status of the air dryer 11.

The air dryer module 10 is connected with loads 51 to 54 provided in the vehicle, and those loads 51 to 54 each have a compressed air circuit in which the compressed air flows. Those loads 51 to 53 configure the above-mentioned brake device, and in this preferred embodiment, the load 51 is a main brake (front wheels), the load 52 is another main brake (rear wheels), and the load 53 is a parking brake. Also, the load 54 is an accessory type such as a horn or a clutch driving mechanism, which is driven by the compressed air. The loads 51 and 52 (main brake) is larger in the amount of air required for operation than the other loads 53 and 54 (parking brake, accessory type). For that reason, an air tank 51*a* and an air tank 52*b*, which can temporarily accumulate the compressed air dried by the air dryer module 10, are disposed between the air dryer module 10, and the loads 51, 52, respectively. The compressed airs accumulated in those air tanks 51*a* and 52*a* are supplied to the respective loads 51 and 52.

The air dryer module 10 includes electromagnetic valves 101, 102, 103 which are opened or closed under the control of the ECU 2, and pressure sensors 121, 122, 123, 124 that detect air pressures in the respective parts of the air dryer module 10, and outputs detected values to the ECU 2. The ECU 2 opens and closes the electromagnetic valves 101 to 103 on the basis of the detected values of the pressure sensors 121 to 123.

The compressor 4 is coupled to the engine through an accessory belt not shown, and compresses air by a driving force of the engine. The compressor 4 is controlled by an air pressure, and its control line is connected with the electromagnetic valve 101, and the compressor 4 is switched between a load state in which the compressor 4 compresses air and an unload state in which the compressor 4 does not compress air by opening or closing the electromagnetic valve 101.

A discharge pipe 41 of the compressor 4 is connected to an inflow pipe 111 of the air dryer module 10, and the inflow pipe 111 is connected with an air dryer 11. The air dryer 11 accumulates a drying agent 231 in a case 20, and removes moisture included in the compressed air discharged from the compressor 4 by the drying agent 231.

An exhaust valve 12 is disposed between the compressor 4 and the air dryer 11, and when the exhaust valve 12 is opened, the compressed air within the main body of the air dryer 11 is exhausted from an exhaust port 112 directly to the external. The exhaust valve 12 is controlled by the air pressure, and its control line is connected with a double check valve 104. The exhaust valve 12 is normally closed, and opened only when an air pressure is applied from the double check valve 104 thereto.

The air dryer module 10 includes a governor 13 that mechanically operates by the air pressure to control the open/close operation of the exhaust valve 12. The governor 13 operates according to the air pressure in a supply channel 106 downstream of the dryer 11, and opens and supplies the air compressor to the double check valve 104 when the air pressure exceeds a given value.

On the other hand, the electromagnetic valve 102 is opened and closed under the control of the ECU 2, and supplies the air pressure of the supply channel 106 to the double check valve 104 in an open state.

When any one of the governor 13 and the electromagnetic valve 102 is opened, the double check valve 104 supplies the air pressure to the exhaust valve 12 to open the exhaust valve 12. Accordingly, when the air pressure in the supply channel 106 is higher than the given value, and when the electromagnetic valve 102 is opened, the exhaust valve 12 is opened, and discharges the compressed air from the exhaust port 112.

In this example, when the exhaust valve 12 is opened in a state where the air pressure within the air dryer module 10 is sufficiently high, the compressed air accumulated downstream of the air dryer 11 (for example, within the supply channel 106 or the air tanks 51*a* and 52*a*) flows backward within the case 20 of the air dryer 11, and is discharged from the exhaust port 112. In this situation, air passing through the case 20 becomes super-dried by a rapid pressure reduction, and the moisture is taken from the drying agent 231 in the case 20. Therefore, the drying agent 231 is regenerated. The regenerated drying agent 231 recovers the adsorption performance for adsorbing moisture so as to remove the moisture in the compressed air. The regenerating operation is executed by opening the electromagnetic valve 102 by the ECU 2 every given time, or in given regeneration timing (given timing) when the air pressure within the air dryer module 10 meets a given condition. In this preferred embodiment, the ECU 2 and the electromagnetic valve 102 function as a regeneration unit that regenerates the drying agent 231 of the air dryer 11.

The air dryer module 10 includes an output port 113 connected with the load 51 (main brake of the front wheels), an output port 114 connected with the load 52 (main brake of the rear wheels), an output port 115 connected with the load 53 (parking brake), and an output port 116 connected with the load 54 (accessory type). The output port 113 is connected with the air tank 51*a*, and the output port 114 is connected with the air tank 52*a*.

The supply channel 106 downstream of the air dryer 11 is connected with a branch chamber 135 through a pressure reducing valve 131. The branch chamber 135 is connected with a supply channel connected to the output port 113 and a supply channel connected to the output port 114. The supply channel connected to the output port 113 is equipped with a protection valve 141, and a supply channel connected to the output port 114 is equipped with a protection valve 142. Also, the branch chamber 135 is connected with a pressure reducing valve 132, and a downstream of the pressure reducing valve 132 is branched into a supply channel connected to the output port 115 and a supply channel connected to the output port 116, which are equipped with protection valves 143 and 144, respectively. The respective protection valves 141 to 144 are arranged in parallel to a throttle and a check valve, and are closed when the circuits in which the compressed air flows are lost in the loads 51 to 54 connected to the output ports 113 to 116, respectively.

Also, in the supply channel connected from the pressure reducing valve 132 to the output port 116, a pressure reducing valve 133 is arranged downstream of the protection valve 144 to supply a pressure-reduced compressed air to the load 54.

Further, in a supply channel between the pressure reducing valve 132 and the protection valve 143, a supply channel 136 that bypasses the protection valve 143 and is connected to the output port 115 is extended. The supply channel 136 includes a check valve 137 that prevents the compressed air from flowing backward from the output port 115 into the branch chamber 135, and a throttle 138 that is disposed in series with the check valve 137.

The pressure sensor 121 detects the air pressure of the supply channel 106, the pressure sensor 122 detects the air pressure downstream of the protection valve 141, that is, the air pressure of the output port 113. The pressure sensor 123 detects the air pressure of the output port 114, and the pressure sensor 124 detects the air pressure of the output port 115. Those detected values are output to the ECU 2 from the respective pressure sensors 121 to 124 as needed.

In the parking brake device of the vehicle corresponding to the load 53, the braking force is released by the air pressure so as to be travelable. More specifically, the parking brake expands a brake shoe by a spring force to exert the braking force during parking, and closes the brake shoe against the spring force by the air pressure supplied from the air dryer module 10 during releasing. The load 53 according to this preferred embodiment has no air tank that accumulates the compressed air therein. However, the air dryer module 10 illustrated in FIG. 15 can surely operate the load 53 without the air tank.

That is, the protection valves 141 and 142 are opened when the compressed air circuits of the corresponding loads 51 and 52 are fully filled with the compressed air. Accordingly, the compressed air of the air tanks 51*a* and 52*a* for the main brake can pass through the pressure reducing valve 132 from the branch chamber 135, and be supplied to the output port 115 through the supply channel 136. For that reason, in a state where the air pressures in the air tanks 51*a* and 52*a* are sufficiently high, the parking brake can be released by supplying the compressed air to the load 53.

On the other hand, when the air pressures in the air tanks 51*a* and 52*a* are insufficiently, the ECU 2 opens the electromagnetic valve 103. An instructed pressure of the electromagnetic valve 103 is given to the check valve 137, the supply channel 136 is closed by the check valve 137, and the supply channel of the compressed air to the output port 115 is interrupted. In this case, the parking brake cannot be released. However, when the air pressures in the air tanks 51*a* and 52*a*, which are used for the main brake, are insufficient, it is preferable that the parking brake is not released. Also, when the air pressures in the air tanks 51*a* and 51*b* are recovered, the parking brake can be released. Accordingly, even if there is no air tank for the load 53, the parking brake can be stably operated by the compressed air.

FIG. 12 is a cross-sectional view illustrating a specific configuration example of the air dryer 11.

As illustrated in FIG. 12, the case 20 of the dryer 11 includes a dryer main body 21, and a cartridge cover 22 that covers the driver main body 21 and is fixed to the dryer main body 21 with bolts 221. The dryer main body 21 includes an inlet 211 which is connected to an inflow pipe 111 (FIG. 15), and into which the compressed air discharged from the discharge pipe 41 of the compressor 4 flows, and the supply channel 106 (FIG. 15) into which the compressed air is discharged from the case 20.

The hollow cartridge cover 22 fixed to an upper portion of the dryer main body 21 houses a cartridge 23. The cartridge 23 is fixed to the dryer main body 21 with bolts 235 so that the compressed air is not leaked to the outside of the cartridge 23.

A space is formed in the interior of the cartridge 23, and the space is filled with the grained drying agent 231. Also, an upper end of the cartridge 23 is equipped with a check valve 232 that exhausts the compressed air to the outside of the cartridge 23. A filter 234 and a spring 233 which press the drying agent 231 from the check valve 232 side are disposed below the check valve 232.

Also, an oil filter 24 that collects oil mist in the circulating air is disposed below the cartridge 23 for the purpose of preventing the oil from entering the space in which the drying agent 231 is accumulated.

The compressed air that has flown from the inlet 211 of the drying agent 231 enters an inflow air chamber 213 disposed in the dryer main body 21, and flows into the cartridge 23 through a flow channel (not shown) formed in the dryer main body 21. The flow channel within the dryer main body 21 is connected to the oil filter 24, and the compressed air that has passed through the oil filter 24 arrives at the drying agent 231.

Then, the compressed air from which the oil is removed by the oil filter 24, and the moisture is adsorbed and removed by the drying agent 231 exits to the outside of the cartridge 23 through the check valve 232, and flows to the outside of the dryer main body 21 from an outlet 212 through a flow channel (not shown) disposed within the cartridge cover 22.

In the dryer main body 21, the exhaust valve 12 is disposed in a flow channel in which the compressed air flows from the inlet 211 to the cartridge 23. The exhaust valve 12 is a valve for exhausting the compressed air within the case 20 to the external as described above. An exhaust pipe 215 is connected to a lower portion of the exhaust valve 12, and a silencer 217 is contained within the exhaust pipe 215. Also, a collar 216 is coupled to a lower end of the exhaust pipe 215, and a silencer 218 is contained in the interior of the collar 216.

When the exhaust valve 12 is opened through the above-mentioned regenerating operation, the compressed air within the case 20 passes through the exhaust pipe 215 and the collar 216, and is exhausted from the exhaust port 112 opened at a lower end of the collar 216. In this case, since the compressed air is roundly exhausted to the external air from the exhaust port 112, airflow sound is suppressed by the silencers 217 and 218 so as not to bring large noise to the environment.

Incidentally, the drying agent 231 of the air dryer 11 is deteriorated with use, and the adsorption performance after regeneration has been conducted is gradually deteriorated. In this description, the deterioration of the drying agent 231 means a state in which even if the drying agent 231 is regenerated, the adsorption performance required for the drying agent 231 cannot be recovered up to a desired level in the compressed air supply system 1. One of causes for the deterioration of the drying agent 231 resides in that the compressor oil that flows from the discharge pipe 41 of the compressor 4 into the air dryer 11 is adhered to the surface of the drying agent 231.

The drying agent 231 is made of porous material such as silica gel. When oil is adhered to the surface of the drying agent 231, countless holes in the surface of the drying agent 231 are filled with the oil, and the amount of adsorption of moisture is deteriorated. In this case, even if the drying agent 231 is regenerated, the adsorption performance required for the drying agent 231 cannot be recovered, and the drying agent 231 needs to be replaced with fresh one. On the contrary, for the purpose of replacing the drying agent 231 of the air dryer 11 with fresh one, because the costs and man-hour are taken, it is desirable to minimize the replacement frequency with determination of appropriate replacement timing.

For that reason, the humidity detection sensor is disposed downstream of the drying agent 231, the humidity of the compressed air after the drying agent 231 has been regenerated by the humidity detection sensor is detected, and the detection value is compared with a given threshold value with the result that the replacement timing of the drying agent 231 can be determined. On the other hand, it is found through experiment that the detection value of the humidity detection sensor is largely different depending on the environments (for example, air flow rate or the ambient temperature) of the installation position of the sensor. Further, the installation position of the humidity detection sensor is frequently different according to the type of vehicle, and there may be a difficulty to accurately determine the replacement timing of the drying agent 231 according to the detection value of the sensor. Under the circumstances, in this preferred embodiment, the magnitude of the threshold value can be changed and set according to the position at which the humidity detection sensor is installed, and the replacement timing of the drying agent 231 can be accurately determined according to the detection value of the humidity detection sensor regardless of the installation position of the humidity detection sensor.

Figure 18:
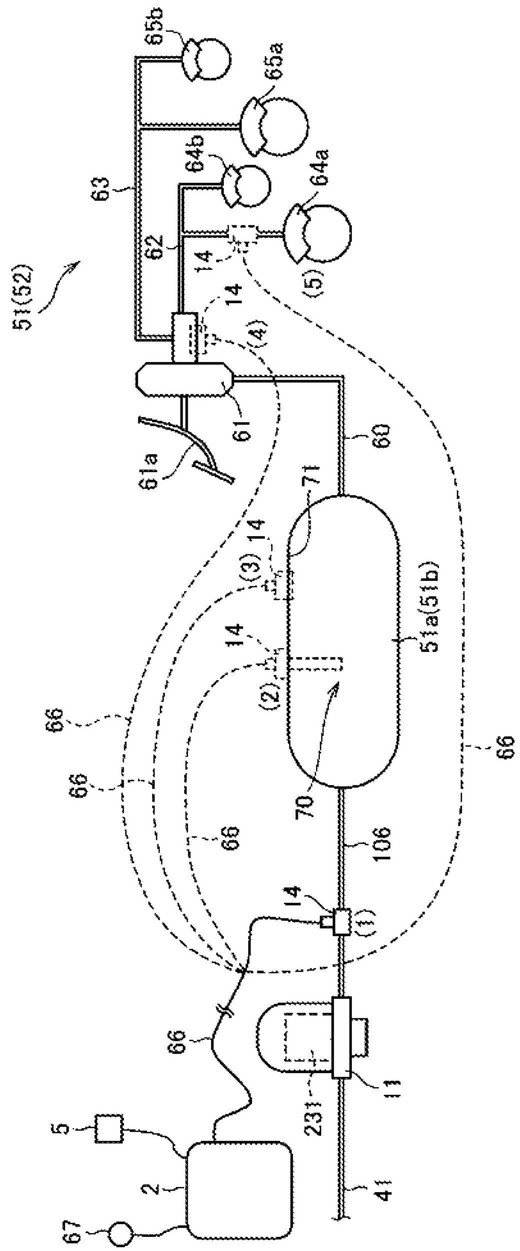
FIG. 18 is a schematic diagram illustrating a position at which a humidity detection sensor is installed.
Figure 20:
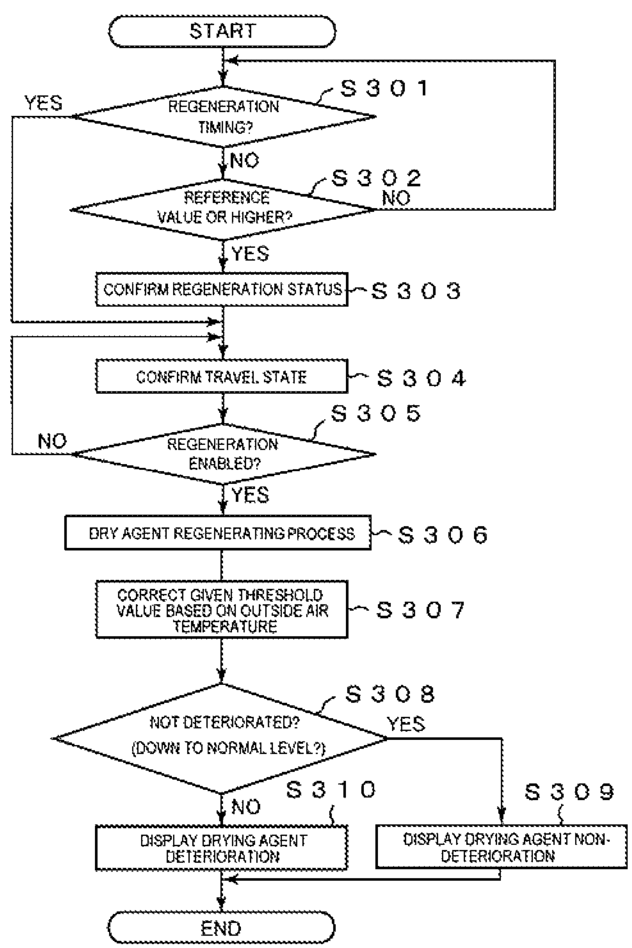
FIG. 20 is a flowchart illustrating the operation of an air dryer module.

FIG. 18 is a schematic diagram illustrating respective positions at which a humidity detection sensor is installed.

The loads 51 and 52 are the main brake as described above, and the main brake includes a brake valve 61 connected to the air tank 51*a* (51*b*) through a connecting pipe 60, front brake chambers 64*a*, 64*b* and rear brake chambers 65*a*, 65*b*, which are connected to the brake valve 61 through connecting pipes 62 and 63, respectively.

The brake valve 61 is equipped with a brake pedal 61*a* that operates the brake valve 61, and when the brake valve 61 is depressed, the brake valve 61 is released, and the compressed air within the air tank 51*a* (51*b*) is guided into the front brake chambers 64*a*, 64*b*, and the rear chambers 65*a*, 65*b* to drive the respective brake shoes (not shown), thus operating the brake.

In FIG. 18, the humidity detection sensor 14 is disposed in the supply channel 106 connecting the air dryer 11 and the air tank 51*a* (51*b*), and the oil detection sensor 14 is connected to the ECU 2 through a harness 66. With this configuration, a signal indicative of the detection value of the oil detection sensor 14 is input to the ECU 2, and the ECU 2 acquires information related to the humidity of the compressed air within the supply channel 106 on the basis of a signal indicative of the input detection value.

The detection value of the humidity detection sensor 14 indicates a relative humidity value of air within the supply channel 106, and also includes information related to the temperature. The ECU 2 is equipped with a display unit 67 that displays the detection result of the humidity detection sensor 14. As specific configurations of the display unit 67, there are an LED that switches lighting, extinction, and blinking according to the detection result, and a liquid display panel that displays the detection result by characters and signs. The display unit 67 may be implemented together with a speed meter of the vehicle. The display unit 67 enables a driver, a mechanic that overhauls the vehicle, or a manger who manages the vehicle to view the detection result of the humidity detection sensor 14, and to appropriately determine the replacement time of the drying agent 231.

In this configuration, the humidity detection sensor 14 can be installed in (1) the supply channel 106 connecting the air dryer 11 and the air tank 51*a* (51*b*), and also installed in any one of, for example, (2) a tank center part 70 of the air tank 51*a* (or 51*b*), (3) a tank inner surface 71 of the air tank 51*a*, (4) the brake valve 61, and (5) the connecting pipe 62 connecting the brake valve 61 and the front brake chambers 64*a*.

As described above, the detection value of the humidity detection sensor 14 is largely different depending on the environments of the installation position of the humidity detection sensor 14. More specifically, a fluctuation of the detected humidity value is large in a location where the flow rate of air is high, and the detected humidity value is stabilized in a location where the flow rate of air is low. Also, the detected humidity value is liable to fluctuate due to an influence of the outside air temperature in the vicinity of the surface of the pipe part or the tank. In this embodiment, as illustrated in FIG. 19, when the humidity detection sensor 14 is installed in (1) the supply channel 106 connecting the air dryer 11 and the air tank 51*a* (51*b*), (4) the brake valve 61, or (5) the connecting pipe 62 connecting the brake valve 61 and the front brake chambers 64*a*, the flow rate of air is high, and the humidity detection sensor 14 is liable to be affected by the outside air temperature. For that reason, when the humidity detection sensor 14 is disposed at a position where the detected humidity value largely fluctuates, a threshold value $\alpha$ for determining the deterioration of the drying agent 231 according to the humidity value is set to a large value (for example 80%).

On the other hand, in (2) the tank center part 70 of the air tank 51*a* (or 51*b*), the flow rate of air is low, and the humidity detection sensor 14 is hardly affected by the outside air temperature. Therefore, the detected humidity value is stably output. For that reason, a threshold value $\beta$ when the humidity detection sensor 14 is disposed at the position where the detected humidity value is stable is set to a value (for example, 60%) sufficiently smaller than the above threshold value $\alpha$. Also, in (3) the tank inner surface 71 of the air tank 51*a*, the humidity detection sensor 14 is liable to be affected by the outside air temperature although the flow rate of air is low. Therefore, a threshold value $\gamma$ when the humidity detection sensor 14 is disposed at this position is set to a value (for example, 70%) larger than the threshold value $\beta$ but smaller than the threshold value $\alpha$. Those threshold values $\alpha$ to $\gamma$ are reference threshold values when the outside air temperature is a reference temperature (for example, 25° C.), and when the outside air temperature fluctuates, the reference threshold values are corrected.

In this preferred embodiment, because the threshold value corresponding to the position at which the humidity detection sensor 14 is installed is set for the ECU 2 according to that position, the ECU 2 compares the threshold value with the humidity value detected by the humidity detection sensor 14, as a result of which the replacement timing of the drying agent 231 can be accurately determined according to the humidity value detected by the humidity detection sensor 14 regardless of the installation position of the humidity detection sensor 14.

The threshold values $\alpha$ to $\gamma$ corresponding to the respective installation positions (1) to (5) are stored in the ECU 2 in advance. When a vehicle manufacturer or a vehicle mechanic attaches the humidity detection sensor 14 to the vehicle, he selects the installation position, and inputs the selected position to the ECU 2, thereby setting the threshold value corresponding to the flow rate of the compressed air at the installation position.

Subsequently, a description will be given of the deterioration determining process of the drying agent 231 by the ECU 2 with reference to FIG. 120. In this description, it is assumed that the humidity detection sensor 14 is disposed in the supply channel 106 connecting the air dryer 11 and the air tank 51*a* (51*b*).

First, the ECU 2 determines whether there comes a given regeneration timing, or not (Step S301). When there does not presently come the given regeneration timing (N in Step S301), the ECU 2 then discriminates whether the humidity level of the compressed air within the supply channel 106 is a given threshold level or higher, or not (Step S302). The regeneration threshold level is a value requiring the regeneration of the drying agent 231 because the compressed air is not sufficiently dried by the drying agent 231. In the discrimination, if it is discriminated that the detected humidity value of the compressed air falls below the given regeneration reference value (No in Step S302), the processing is returned to the discrimination of Step S301. Also, if it is discriminated the humidity value of the compressed air is the given regeneration reference value or higher (Yes in Step S302), the ECU 2 confirms, for example, the accumulated ventilation volume of the air dryer 11. Then, the ECU 2 confirms the travel state of the vehicle (Step S204) to confirm the regeneration status of the drying agent 231 (Step S303).

Then, the ECU 2 confirms the travel state of the vehicle (Step S304), and discriminates whether the drying agent 231 can be presently regenerated, or not, on the basis of the travel state of the vehicle (Step S305). In more detail, the ECU 2 discriminates whether the drying agent 231 can be regenerated, or not, on the basis of whether the vehicle is presently stopping, or not, whether pressures within the air tanks 51*a* and 51*b* are sufficient to regenerate the given drying agent 231, or not, or whether the vehicle is during the brake assist operation, or not.

In this case, for example, when the vehicle is not stopping, the pressures within the air tanks 51*a* and 51*b* are sufficient to regenerate the given drying agent 231, and the vehicle is not during the brake assist operation, it is discriminated that the drying agent 231 can be regenerated. On the other hand, when, not depending on the travel state of the vehicle, the pressures within the air tanks 51*a* and 52*a* are not sufficient to regenerate the given drying agent 231, or the vehicle is during the brake assist operation, it is discriminated that the drying agent 231 cannot be regenerated.

If it is discriminated that the drying agent 231 can be presently regenerated in Step S305 (Yes 30 in Step S305), the ECU 2 regenerates the drying agent 231 regardless of a given regeneration timing (Step S306). In more detail, the ECU 2 opens the electromagnetic valve 102, and allows the compressed air accumulated downstream of the air dryer 11 (for example, within the supply channel 106 or the air tanks 51*a* and 52*a*) to flow backward and be discharged from the exhaust port 112. With this operation, air passing through the case 20 becomes super-dried by a rapid pressure reduction, and the moisture is taken from the drying agent 231 within the case 20. Therefore, the drying agent 231 is regenerated. Also, if it is discriminated that there comes the given regeneration timing in Step S301 (Yes 30 in Step S301), the travel state is confirmed (Step S304), and if the regeneration is enabled (Yes 30 in Step S305), the drying agent 231 is regenerated (Step S306).

Then, the ECU 2 acquires the outside air temperature, and corrects a threshold value set in correspondence with the flow rate of the compressed air at the installation position of the humidity detection sensor 14 (Step S307). In this example, the threshold value is a value used for determining the deterioration of the drying agent 231 (whether the adsorption performance required for the drying agent 231 is recovered by regeneration, or not) according to the detected humidity value. The threshold value is set in correspondence with the position at which the humidity detection sensor 14 is installed.

More specifically, the reference threshold values at the reference temperature (for example 25° C.) is stored in the ECU 2 as a map in which the corrected threshold values corrected by a change in the outside air temperature are associated with the outside air temperatures, and the corrected threshold value corresponding to the outside air temperature is read and set. In this configuration, a relationship between the outside air temperature and the corrected threshold value is set such that the corrected threshold value is changed to a larger value as the outside air temperature becomes higher, and the corrected threshold value is changed to a smaller value as the outside air temperature becomes lower. In this way, because the threshold value is corrected on the basis of the outside air temperature, the threshold value can rapidly respond to a change in season or weather, and the replacement timing of the drying agent 231 can be accurately determined in any weather condition.

Also, in this preferred embodiment, the amount of correction based on a change in the temperature is not constant in the respective threshold values α to γ. It is desirable that in the threshold value α set to a larger value, the amount of correction based on the change in the temperature is set to a larger value, and in the threshold value β set to a smaller value, the amount of correction based on the change in the temperature is set to a smaller value. According to this configuration, because the threshold values are set in correspondence with the installation position of the humidity detection sensor 14 and the ambient environment, the replacement timing of the drying agent 231 can be more accurately determined.

Then, after the drying agent 231 has been regenerated, the ECU 2 acquires the humidity value detected by the humidity detection sensor 14, and discriminates whether the drying agent 231 is deteriorated, or not, on the basis of the humidity value (Step S308). More specifically, the ECU 2 discriminates whether the humidity value of the compressed air within the supply channel 106 falls below the threshold value corrected in the above Step S307, or not.

If it is discriminated that the humidity value of the compressed air falls below the corrected threshold value in Step S308 (Yes 30 in Step S308), it can be determined that the adsorption performance of the drying agent 231 is restored by regeneration. For that reason, the ECU 2 determines that the drying agent 231 is not deteriorated, and outputs a determination value indicating that the drying agent 231 is not deteriorated to the display unit 67, and allows the display unit 67 to display a fact that the drying agent 231 is not deteriorated (Step S309).

On the other hand, if it is discriminated that the humidity value of the compressed air does not fall below the corrected threshold value in Step S308 (No in Step S308), because the adsorption performance required for the drying agent 231 is not recovered even if the regeneration is conducted, there is a high possibility that the drying agent 231 is deteriorated. For that reason, the ECU 2 determines that the drying agent 231 is deteriorated, and outputs a determination value indicating that the drying agent 231 is not deteriorated to the display unit 67, and allows the display unit 67 to display a fact that the drying agent 231 is not deteriorated (Step S310). In this way, in Step S308, the ECU 2 functions as the deterioration determination unit that determines the deterioration of the drying agent 231.

As described above, according to this preferred embodiment, there are provided the air dryer 11 that is disposed in the discharge line of the compressor 4, and removes the moisture included in the compressed air, and the humidity detection sensor 14 installed downstream of the drying agent 231 of the air dryer 11. The drying agent 231 is regenerated in the given timing, and the detected value of the humidity detection sensor 14 after the drying agent 231 has been regenerated is compared with the threshold value set in correspondence with the flow rate of the compressed air at the installation position of the humidity detection sensor 14 according to that position. As a result, the deterioration of the drying agent 231 can be determined regardless of the installation position of the humidity detection sensor 14, and the replacement timing of the drying agent 231 can be accurately determined.

Also, according to this preferred embodiment, the threshold value is set to be larger when the humidity detection sensor 14 is installed at the position where the flow rate of the compressed air is high, and the humidity value largely fluctuates, and smaller when the humidity detection sensor 14 is installed at the position where the flow rate is low, and the humidity value is stable. Therefore, the deterioration of the drying agent 231 can be accurately determined, and the replacement timing of the drying agent 231 can be accurately determined.

Also, according to this preferred embodiment, the outside air temperature detection sensor 5 that detects the outside air temperature is provided, and the threshold value is corrected according to the detected outside air temperature. Therefore, the threshold value can rapidly respond to a change in season or weather, and the replacement timing of the drying agent 231 can be accurately determined in any weather condition.

Also, according to this preferred embodiment, because the amount of correction is adjusted according to the magnitude of the flow rate of the compressed air, the threshold value can be appropriately set at each installation position, and the replacement timing of the drying agent 231 can be more accurately determined.

Also, the above-described tenth preferred embodiment shows a mode for carrying out the present invention, and the present invention is not limited to the tenth preferred embodiment. For example, the humidity detection sensor 14 can be installed in any one of (1) the supply channel 106 connecting the air dryer 11 and the air tank 51*a* (51*b*), (2) the tank center part 70 of the air tank 51*a* (or 51*b*), (3) the tank inner surface 71 of the air tank 51*a*, (4) the brake valve 61, and (5) the connecting pipe 62 connecting the brake valve 61 and the front brake chambers 64*a*. However, the present invention is not limited to this configuration, but, the humidity detection sensor 14 may be attached to other positions.

Also, in this preferred embodiment, when the threshold value is corrected, the corrected threshold values stored in association with the outside air temperature in the ECU 2 are read and set. Alternatively, the ECU 2 may calculate the corrected threshold values on the basis of the outside air temperature, and set the calculate value.

Also, the loads connected to the air dryer module 10 are not limited to the main brake device, the parking brake, and the accessory type, but the air dryer module 10 may be connected to any equipment if the equipment uses the compressed air, and the other detailed configurations can be arbitrarily changed. Also, the vehicle that is a target of the compressed air supply device for a vehicle according to the present invention is not particularly limited, but may be any one of a heavy vehicle, a small vehicle, a specialized vehicle, a tow vehicle, a two-wheel vehicle, and a three-wheel vehicle, and its scale and form are arbitrary.

It will be appreciated by those skilled in the art that changes could be made to the preferred embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A compressed air supply system comprising:

an air compressor driven by an engine of a vehicle;

a compressed air supply unit that supplies a compressed air discharged from the air compressor to a load of the vehicle;

a control unit that switches the air compressor between a load state and an unload state according to a demand of the load; and a pressure sensor that detects air pressure in the compressed air supply unit to output a detected air pressure to the control unit;

wherein, the control unit switches the air compressor between the load state and the unload state so that the air pressure in the compressed air supply unit falls within a given range, but when the vehicle requires a braking force, the control unit puts the air compressor into the load state and holds the air compressor in the load state regardless of the demand of the load and regardless of the air pressure in the compressed air supply unit and opens an exhaust valve disposed in the compressed air supply unit to hold the air pressure in the compressed air supply unit within the given range.

2. The compressed air supply system according to claim 1, wherein the control unit discriminates whether there is a case in which the vehicle requires the braking force, or not, on a basis of the operation of ordering the actuation of an auxiliary braking device provided in the vehicle.

3. The compressed air supply system according to claim 1, wherein the control unit puts the air compressor into the unload state in at least any one of a case where the vehicle is being accelerated and a case where the vehicle is traveling at a high speed.

4. A method of controlling an air compressor that is driven by an engine of a vehicle, and supplies compressed air to a load of the vehicle from a compressed air supply unit, the method comprising:

switching between a load state and an unload state of the air compressor according to a demand of a load so that air pressure in the compressed air supply falls with a given range; and when the vehicles requires a braking force, putting the air compressor into the load state and holding the air compressor in the load state regardless of the air pressure in the compressed air supply unit, and opening an exhaust valve disposed in the compressed air supply unit to hold the air pressure in the compressed air supply unit with the given range.

5. A compressed air supply device for a vehicle, which includes an air compressor mounted in the vehicle, and supplies a compressed air discharged from the air compressor to a load of the vehicle, the compressed air supply device comprising:

an air dryer that removes a foreign material in the compressed air, which is disposed in a discharge line of the air compressor;

an oil detection sensor disposed in the air dryer; and an output unit that outputs a detection result of the oil detection sensor.

6. The compressed air supply device for a vehicle according to claim 5, wherein the oil detection sensor is disposed within a case of the air dryer.

7. The compressed air supply device for a vehicle according to claim 5, wherein the oil detection sensor is disposed in a vicinity of an introduction part of the air dryer, which introduces the compressed air to a drying agent.

8. The compressed air supply device for a vehicle according to claim 5, wherein the oil detection sensor comprises a concentration sensor that detects an oil mist concentration.

9. The compressed air supply device for a vehicle according to claim 5, wherein the oil detection sensor comprises an electrode disposed in an oil accumulation part of a case bottom in the air dryer.

10. A compressed air supply device for a vehicle, which includes an air compressor mounted in the vehicle, and supplies a compressed air discharged from the air compressor to a load of the vehicle, the compressed air supply device comprising:

an air dryer that removes a foreign material in the compressed air, which is disposed in a discharge line of the air compressor; and an exhaust valve that exhausts moisture accumulated in the air dryer together with the compressed air to atmosphere, and a temperature sensor for detecting atmospheric air temperature, wherein the exhaust valve is configured to open and exhaust the moisture accumulated within the air dryer to the atmosphere when the detected atmospheric air temperature meets a given condition.

11. The compressed air supply device for a vehicle according to claim 10, wherein when an operation of the vehicle stops, the exhaust valve is opened to exhaust the moisture accumulated in the air dryer to the atmosphere.

12. The compressed air supply device for a vehicle according to claim 10, wherein the vehicle is connected to an outside air temperature sensor mounted therein, and the exhaust valve is opened to exhaust the moisture accumulated in the air dryer to the atmosphere when an outside air temperature detected by the outside air temperature sensor falls below a given temperature.

13. The compressed air supply device for a vehicle according to claim 10, further comprising:

a humidity sensor that detects a temperature of the compressed air is disposed in a flow passage of the compressed air downstream of the air dryer, wherein the exhaust valve is opened to exhaust the moisture accumulated in the air dryer to the atmosphere when the temperature of the compressed air, which is detected by the temperature sensor, falls below a given temperature.

14. A compressed air supply device for a vehicle, which includes an air compressor mounted in the vehicle, and supplies a compressed air discharged from the air compressor to a load of the vehicle, the compressed air supply device comprising:

an air dryer having a drying agent that removes a foreign material in the compressed air, which is disposed in a discharge line of the air compressor;

a humidity detection sensor located downstream of the drying agent of the air dryer for detecting a humidity level downstream of the drying agent;

a regeneration unit that regenerates the drying agent in the air dryer in a given timing; and a deterioration determination unit that compares the detected humidity level of the humidity detection sensor after the drying agent is regenerated by the regeneration unit with a threshold value set in correspondence with a flow rate of the compressed air at an installation position of the humidity detection sensor, to determine deterioration of the drying agent.

15. The compressed air supply device for a vehicle according to claim 14, wherein the threshold value is set to be larger when the humidity detection sensor is located at a position where the flow rate of the compressed air is higher, and is set to be smaller when the humidity detection sensor is located at a position where the flow rate of the compressed air is lower.

16. The compressed air supply device for a vehicle according to claim 14, further comprising an outside air temperature detection sensor that detects an outside air temperature, and a correction unit that corrects the threshold valve according to the detected outside air temperature.

17. The compressed air supply device for a vehicle according to claim 16, wherein the correction unit adjust the correction amount according to a magnitude of the flow rate of the compressed air.

* * * * *